United States Patent
Tran et al.

(10) Patent No.: US 12,522,798 B2
(45) Date of Patent: Jan. 13, 2026

(54) MICROORGANIC DETECTION SYSTEM USING A DEEP LEARNING MODEL

(71) Applicant: NEOGEN FOOD SAFETY US HOLDCO CORPORATION, Lansing, MI (US)

(72) Inventors: Thanh Quoc Tran, Blaine, MN (US); Hugh Eugene Watson, Prior Lake, MN (US)

(73) Assignee: NEOGEN FOOD SAFETY US HOLDCO CORPORATION, Lansing, MI (US)

( * ) Notice: Subject to any disclaimer, the term of this patent is extended or adjusted under 35 U.S.C. 154(b) by 230 days.

(21) Appl. No.: 17/904,854

(22) PCT Filed: May 12, 2021

(86) PCT No.: PCT/IB2021/054061
§ 371 (c)(1),
(2) Date: Aug. 23, 2022

(87) PCT Pub. No.: WO2021/234513
PCT Pub. Date: Nov. 25, 2021

(65) Prior Publication Data
US 2023/0111370 A1    Apr. 13, 2023

Related U.S. Application Data

(60) Provisional application No. 63/026,372, filed on May 18, 2020.

(51) Int. Cl.
*C12M 1/34* (2006.01)
*C12M 1/00* (2006.01)
(Continued)

(52) U.S. Cl.
CPC ............ *C12M 41/36* (2013.01); *C12M 41/06* (2013.01); *G06T 7/0012* (2013.01); *G06V 10/82* (2022.01);
(Continued)

(58) Field of Classification Search
CPC ....... G06T 5/00; G06T 7/0012; G06T 7/0014; G06T 7/0016; G06T 2207/10056;
(Continued)

(56) References Cited

U.S. PATENT DOCUMENTS

| 9,292,729 | B2 * | 3/2016 | Guthrie | G06V 10/426 |
| 9,677,108 | B2 * | 6/2017 | Bolea | C12Q 1/04 |
| 10,769,409 | B2 * | 9/2020 | Robinson | G06T 7/33 |
| 11,321,843 | B1 * | 5/2022 | Harkness | G06T 7/90 |

(Continued)

FOREIGN PATENT DOCUMENTS

CN          117746423 A   *  3/2024
WO      WO-2023215688 A1  * 11/2023

OTHER PUBLICATIONS

Chiang, Pei-Ju, et al. "Automated counting of bacterial colonies by image analysis." Journal of microbiological methods 108, pp. 74-82 (Year: 2015).*

(Continued)

*Primary Examiner* — Scott A Rogers
(74) *Attorney, Agent, or Firm* — HYLTON-RODIC LAW PLLC

(57) ABSTRACT

Aspects of the present disclosure relate to a method of colony enumeration. The method includes identifying colony forming units of microorganisms in a combined image using a pretrained deep learning model on a colony enumeration device. The method can include providing a plurality of identification characteristics of the colony forming units to an interaction component such that the interaction component can project at least some of the plurality of identification characteristics onto the combined image.

19 Claims, 9 Drawing Sheets

(51) Int. Cl.
 *G06T 7/00* (2017.01)
 *G06V 10/82* (2022.01)
 *G06V 20/69* (2022.01)

(52) U.S. Cl.
 CPC ............... *G06V 20/698* (2022.01); *G06T 2207/10056* (2013.01); *G06T 2207/10152* (2013.01); *G06T 2207/20081* (2013.01); *G06T 2207/20084* (2013.01); *G06T 2207/30024* (2013.01); *G06T 2207/30242* (2013.01)

(58) Field of Classification Search
 CPC ........... G06T 2207/10152; G06T 2207/20081; G06T 2207/20084; G06T 2207/30024; G06T 2207/30242; C12M 41/06; C12M 41/36; G06V 10/82; G06V 20/698
 See application file for complete search history.

(56) References Cited

U.S. PATENT DOCUMENTS

| | | | | |
|---|---|---|---|---|
| 12,247,197 | B2* | 3/2025 | Talebpour | G02B 21/367 |
| 2004/0102903 | A1* | 5/2004 | Graessle | G01N 15/1433 |
| | | | | 702/19 |
| 2013/0109051 | A1* | 5/2013 | Li | G06T 7/0012 |
| | | | | 435/288.7 |
| 2018/0089828 | A1* | 3/2018 | Wiles | G01N 21/27 |
| 2020/0401787 | A1* | 12/2020 | Robinson | G06V 20/698 |
| 2021/0142037 | A1* | 5/2021 | Robinson | G06V 20/698 |
| 2022/0259636 | A1* | 8/2022 | Kim | G01N 33/18 |
| 2023/0060037 | A1* | 2/2023 | Ozcan | G06N 3/045 |
| 2023/0127199 | A1* | 4/2023 | Tran | G06V 20/698 |
| | | | | 382/133 |

OTHER PUBLICATIONS

Puchkov, Evgeny. "Image analysis in microbiology: a review." Journal of Computer and Communications 4, No. 15, p. 8 (Year: 2016).*

Ferrari, Alessandro, Stefano Lombardi, and Alberto Signoroni. "Bacterial colony counting with convolutional neural networks in digital microbiology imaging." Pattern Recognition 61, pp. 629-640 (Year: 2017).*

Zieliaski, Bartosz, et al. "Deep learning approach to bacterial colony classification." PloS one 12, No. 9: e0184554 (Year: 2017).*

Zhang, Louis. "Machine learning for enumeration of cell colony forming units." Visual Computing for Industry, Biomedicine, and Art. 5, No. 1, p. 26 (Year: 2022).*

Zhang, Jiawei, et al. "A comprehensive review of image analysis methods for microorganism counting: from classical image processing to deep learning approaches." Artificial Intelligence Review, pp. 1-70 (Year: 2022).*

Rani, Priya, et al. "Machine learning and deep learning based computational approaches in automatic microorganisms image recognition: methodologies, challenges, and developments." Archives of Computational Methods in Engineering 29, No. 3, pp. 1801-1837 (Year: 2022).*

Rodrigues, Pedro Miguel, Jorge LuÃs, and Freni KekhasharÃº Tavaria. "Image analysis semi-automatic system for colony-forming-unit counting." Bioengineering 9, No. 7, p. 271 (Year: 2022).*

Ma, Luyao, et al. "Accelerating the detection of bacteria in food using artificial intelligence and optical imaging." Applied and Environmental Microbiology, vol. 89, issue 1, pp. 01828-22 (Year: 2023).*

Jansen, Bernard J. "The graphical user interface." ACM SIGCHI Bulletin 30.2 pp. 22-26 (Year: 1998).*

Myers, Brad A. "A brief history of human-computer interaction technology." interactions 5.2 pp. 44-54 (Year: 1998).*

Chen, Wei-Bang, and Chengcui Zhang. "An automated bacterial colony counting and classification system." Information Systems Frontiers 11.4, pp. 349-368 (Year: 2009).*

Kumar, Saurabh, and Gauri S. Mittal. "Rapid detection of microorganisms using image processing parameters and neural network." Food and Bioprocess Technology 3.5, pp. 741-751 (Year: 2010).*

Puchkov, Evgeny. "Image analysis in microbiology: a review." Journal of Computer and Communications 4.15, pp. 8-33 (Year: 2016).*

* cited by examiner

MICROORGANIC DETECTION SYSTEM USING A DEEP LEARNING MODEL

CROSS REFERENCE TO RELATED APPLICATIONS

This application is a national stage filing under 35 U.S.C. 371 of PCT/IB2021/054061, filed May 12, 2021, which claims the benefit of Provisional Application No. 63/026,372, filed May 18, 2020, the disclosure of which is incorporated by reference in its/their entirety herein.

BACKGROUND

The food industry routinely monitors the levels of indicator groups of microorganisms. These microorganisms are considered quality and hygienic indicators and can pose health hazards to humans. A common method of quantifying indicator microorganisms is identifying and counting colony forming units. The counting can be performed by first culturing target microorganisms on culture devices (e.g., dry film or agar plates), then counting the colony forming units. Colony counts may be done at multiple stages including on incoming materials, in process product, finished product, and environmental samples taken from within the food processing environment.

The colony count data for many purposes can be used to meet regulatory requirements, shelf life claims, reduce spoilage, ensure hygiene of process and facilities, ensure effectiveness of process steps (cooking, pasteurization, decontamination, etc.), or ensure final product is free from contamination which could cause illness.

Counting colonies on growth media and interpretation of these counts can be very complex and can greatly benefit from improvements in colony enumeration devices and software. The unique challenges and requirements in this space which make this a complex effort include A) media interpretation challenges and accuracy requirements, B) physical factors of the media, and C) complexity of data.

BRIEF SUMMARY

Aspects of the present disclosure relate to a method of colony enumeration using a pretrained deep learning model. The method includes identifying colony forming units of microorganisms in a combined image using a pretrained deep learning model on a colony enumeration device. The method can include providing a plurality of identification characteristics of the colony forming units to an interaction component such that the interaction component can project at least some of the plurality of identification characteristics onto the combined image.

Additionally, the method can include image capturing, with image capture circuitry, a culture device at a plurality of illumination settings to form a plurality of images. The culture device corresponds to the combined image. The method can include image enhancing, with the image enhancement circuitry, the plurality of images to form a plurality of enhanced images. The method can also include transmitting the plurality of enhanced images to the interaction component using direct memory access or a memory bus. At least two of: the image capturing process, the image enhancing process, and the transmitting to the interaction component process occur concurrently (using overlapped interleaved processing) for different image instances. The combined image can be formed from at least some of the plurality of enhanced images that were previously transmitted.

Aspects of the present disclosure can relate to a colony enumeration device. The colony enumeration device can include a single-board computer. The single-board computer can include neural network circuitry and input output circuitry configured to communicatively couple to an interaction component.

The single-board computer can also include a processor and a memory storing instructions that, when executed by the processor, configure the single-board computer to identify colony forming units of microorganisms in a combined image, using a pretrained deep learning model on the neural network circuitry. The memory also stores instructions that provide a plurality of identification characteristics of the colony forming units to an interaction component such that the interaction component can project at least some of the plurality of identification characteristics onto the combined image.

The colony enumeration device also includes image capture circuitry communicatively coupled to the single-board computer and configured to image capture a culture device at a plurality of illumination settings to form a plurality of images. The image capture circuitry comprises illumination circuitry that controls the plurality of illumination settings to illuminate the culture device.

The single-board computer comprises image enhancement circuitry configured to perform image enhancing on the plurality of images to form a plurality of enhanced images. The memory of the single-board computer stores instructions that, when executed by the processor, configured the input output circuitry to transmit the plurality of enhanced images to an interaction component using direct memory access. At least two of the image capturing process, image enhancing process, or transmitting to the interaction component process occur concurrently for different image instances.

Aspects of the present disclosure relate to a microorganic detection system that includes the colony enumeration device and an interaction component comprising a display device. The interaction component is configured to project at least some of the plurality of identification characteristics onto the combined image within 6 seconds of the culture device being received by a feed mechanism of the colony enumeration device.

The above summary of the present disclosure is not intended to describe each disclosed embodiment or every implementation. The description that follows more particularly exemplifies illustrative embodiments. In several places throughout the application, guidance is provided through lists of examples, which examples can be used in various combinations. In each instance, the recited list serves as a representative group and should not be interpreted as an exclusive list.

Additional details of these and other embodiments are set forth in the accompanying drawings and the description below. Other features, objects and advantages will become apparent from the description and drawings, and from the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

When using an artificial intelligence framework, such as a deep learning model, for the identification and classification of colonies on the culture device, the results need to be both accurate and timely. These two performance measures can be important for judging the fitness to ship of food or the allowed usage for raw materials to get the results as soon as possible to limit storage needs. The results can be returned before the culture device changes because of growth of the colonies so the culture device can be used for verification or confirmation by picking the colonies.

Also, since automation is compared to hand reading of plates, the time to result can be an important measure of the value of a device for automated colony recognition. Many artificial intelligence-type systems for colony determination on growth media use internet-based artificial intelligence engines that can greatly delay the results. Using standard PC, Smart Phone, or Tablet resources can not only delay the result, but also can introduce an element of variability in the time to result based on: the user equipment, what else is running on the equipment, the introduction of updates, and virus/spam/trojan/bot protection.

Aspects of the present disclosure relate to faster and more consistent identification of colony forming units of microorganisms with dedicated computational resources contained within the colony enumeration device. Further, by use of concurrent processing of two or more processes related to image handling and in parallel with an interaction component, the total time from the culture device being received to identification of the colony forming units can be no greater than six seconds versus 20-30 seconds using a general-purpose computer.

Figure 1:
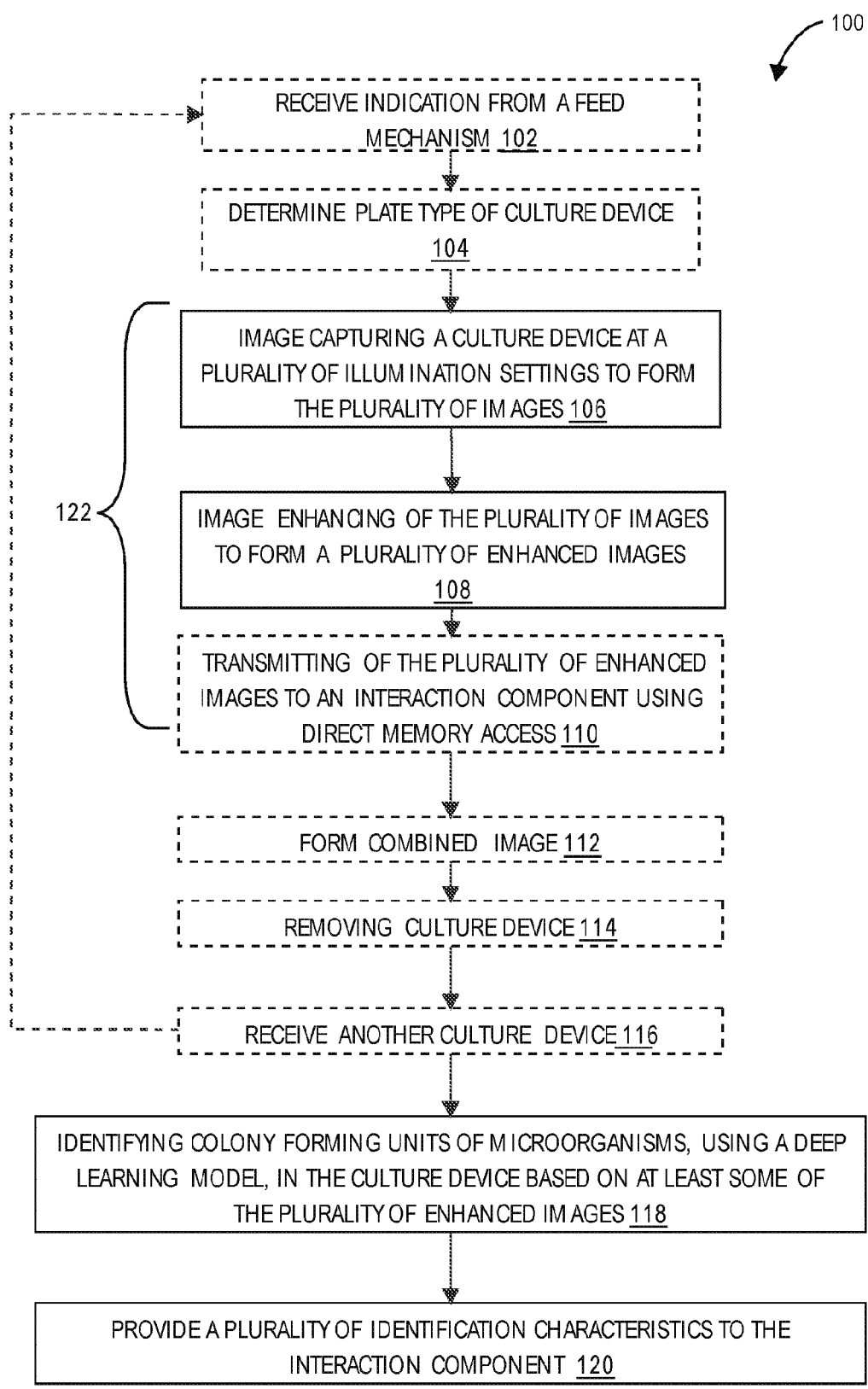
FIG. 1 illustrates a method 100 in accordance with one embodiment.

FIG. 1 illustrates a method 100 of distributed colony enumeration of a culture device. The method 100 can utilize a microorganic detection system including a colony enumeration device and an interaction component. Overlapped interleaved processing can be performed on two or more processes by the colony enumeration device to shorten the overall processing time to provide a plurality of identification characteristics of colony forming units within an image of the culture device.

In block 102, the colony enumeration device can optionally receive an indication from a feed mechanism that the culture device has been inserted and is in position. The indication can initiate a series of actions. For example, the indication can allow the camera to begin image capture of the culture device. In at least one embodiment, the colony enumeration device can cause a pressing mechanism to actuate and flatten the culture device in response to the indication. The pressing mechanism can ensure uniformity in the culture device by keeping the culture device flat so that a region of interest can be evenly illuminated. The flattening can remove curvatures from the culture device that can occur due to handling, affect the fluid during inoculation, incubation effects due to accelerated temperatures, or combinations thereof.

In block 104, the colony enumeration device can optionally determine the plate type of the culture device. The plate type corresponds to a makeup of the culture device, including the types of microorganisms detectable. Certain plate types can optionally be exempted from one or more processes of the method 100. For example, if certain plate types are found, then the method can capture the image, but avoid block 118 and block 120. In a more specific example, if there was a culture device having an "all count" plate type, then the colony enumeration device can avoid using the deep learning model for processing the images for the culture device and cause the interaction component to perform the processing using a directed feature extraction or other image processing techniques. For example, when the interaction component receives the last image, the interaction component can carry out image processing and enumeration functionality and can deliver a count for each colony forming unit (and according to type), the x,y coordinates for each colony forming unit center point and the extent of the colony forming unit. The size of the colony forming unit can determine how the culture device is processed (e.g., spreaders and liquefiers).

The plate type can be specified based on a worklist or other user interface specification of the plate type. The plate type can also be verified by a reader on the feed mechanism (e.g., a barcode reader). The plate type can also allow the illumination circuitry to provide a unique illumination setting for each plate type. For example, an "all count" plate type can avoid using base lighting. In at least one embodiment, the plate type determination can also trigger diagnostic functions. For example, if a plate type is determined, then the image enhancement can be avoided for the image(s).

Block 106, block 108, and block 110 can occur using concurrent processing 122 as described herein. The concurrent processing 122 can result in different image instances being processed in a shorter period of time, thus improving the overall time to produce an image with the microorganisms identified. At least two of block 106, block 108, or block 110 can be performed using concurrent processing 122 for different image instances. In at least one embodiment, the term concurrent processing 122 can also use parallel processing where two or more image instances are processed at the same time (e.g., on different cores of the processor). The concurrent processing 122 can be described further herein (e.g., FIG. 5, and FIG. 6)

In block 106 (i.e., the image capturing process), the image capture circuitry can capture a plurality of images of the culture device at a plurality of illumination settings. The illumination setting can be established (or at least partially determined) by illumination circuitry that can illuminate the culture device with an illumination setting. The illumination setting can also be determined in part by the ambient light conditions if the culture device is not optically isolated. In at least one embodiment, the image capture circuitry can reduce or eliminate the ambient light conditions.

For example, the illumination setting can include the brightness, wavelength, and intensity of the illuminated light from the illumination circuitry. In at least one embodiment, the illumination setting can also include the positioning of light relative to the culture device. For example, a culture device can be illuminated from the top, bottom, side (incident angle or orthogonal), or combinations thereof. As described herein, the culture device may use illumination from multiple angles.

Each image from a plurality of images can be associated with an illumination setting from a plurality of illumination settings. In at least one embodiment, the illumination setting can be set such that a color channel is optically enhanced. For example, the illumination setting can be a red light corresponding to an image with a red color channel; a green light corresponding to an image with a green color channel, or a blue light corresponding to an image with a blue color channel.

The illumination circuitry can include one or more light sources. The light sources can utilize fluorescence, incandescence, bioluminescence, or combustion of the underlying material. In one example, the light sources can include primary color channels, e.g., a blue Light Emitting Diode (LED), red LED, and green LED. The illumination setting is configured based on the culture device, specifically the plate type. For example, an "all count" plate type can be illuminated from the top.

In at least one embodiment, the plurality of images can be in a sequence of images with each image from the sequence corresponding to a particular color channel. The sequence can optionally assist with interleaving the images such that each color's intensity and light level from different angles can adjust separately for that color channel. At least two color channels, thus at least two images, can be represented. Preferably, the plurality of images can be three images corresponding to red, blue, and green color channels although more or different color channels are contemplated. In at least one embodiment, each of the images from the sequence of images is of the plate at the same time/growth instance but differ in the color. For example, the terms first and second images do not mean significantly different incubation times for comparison of the difference.

In block 108 (i.e., the image enhancing process), the image enhancement circuitry can enhance a plurality of images stored in the memory to form a plurality of enhanced images. Block 108 can occur using overlapped interleaved processing with the image capturing in block 106 as described herein. For example, an image corresponding to a red color channel can be image enhanced while an image corresponding to a green color channel is being captured as described further herein.

The image capture circuitry can include a separate graphic processing unit (GPU) on a single-board computer. The GPU can perform the image enhancement which can include flat field normalization, convolutions, sharpening, histogramic equalization, blur, erode, gamma shift, gain, offset adjustments, contrast enhancements, or combinations thereof. The image enhancement is configured to improve detection and classification of microorganisms by the deep learning model. Once enhanced, the enhanced images can be stored in the memory.

In block 110 (i.e., the transmitting to the interaction component process), the colony enumeration device (e.g., via an input output circuitry such as Universal Serial Bus (USB)) can transmit any of the plurality of enhanced images to an interaction component using direct memory access (DMA). The transmission can occur without processor intervention. In at least one embodiment, the transmission can trigger concurrent processing for a different image instance. For example, the block 106 or block 108 can be initiated based on the transmission to the interaction component. The interaction component can combine the plurality of enhanced images (once received) into a combined image.

In at least one embodiment, the enhanced image can be transmitted not only to the interaction component, but also to the deep learning model where the enhanced image can be optionally processed by the deep learning model as a single-color channel. For example, the deep learning model can process the image as a single 8-bit image in block 118 while waiting on subsequent images to be captures under a different illumination setting. Although the word "transmit" is used, the enhanced image can be accessed by the neural network circuitry by accessing the memory where the enhanced image is stored.

In at least one embodiment, the transmitting to the interaction component in block 110 is optional. For example, the display device can be connected to or integrated with the colony enumeration device and the microorganic detection system can omit an external computer entirely. By eliminating the external computer, or merging components from the colony enumeration device, a more streamlined microorganic detection system can result. For example, the microorganic detection system can be a standalone device for the purpose of enumerating colony forming units of microorganisms. The microorganic detection system can have distributed components, e.g., the image capture circuitry can be standalone from both the colony enumeration device, and the interaction component.

In block 112, once all of the images corresponding to different color channels are captured, then a combined image can be formed by the colony enumeration device. The combined image can be formed after the last image in the sequence of images is image enhanced. The combined image can then be transmitted to the neural network circuitry. The combined image can be based on a sequence of enhanced images. For example, the order of the sequence of enhanced images can be determinative in the interleaving of the combined image. In addition, the interaction component can form a second combined image from the plurality of enhanced images that were previously transmitted. The second combined image can be a duplicate of the combined image with the same coordinate system so that coordinates from an identification characteristic can be projected onto the second combined image.

In block 114, the culture device optionally can be removed from the colony enumeration device. This can be performed manually by a user or automatically via the feed mechanism. For example, the feed mechanism can have machinery that will move the first culture device out of a camera capture area and out of the colony enumeration device. In at least one embodiment, the feed mechanism can have a pressing mechanism and the colony enumeration device can wait for the pressing mechanism to fully disengage before releasing the culture device.

In block 116, the colony enumeration device can optionally receive a second culture device that is different from the culture device in block 102. The colony enumeration device can process the second culture device similarly to the first culture device. For example, a user can load the second culture device into a feed mechanism where block 102 through block 114 can occur at least partially concurrently for the second culture device with the culture device being processed using block 118.

In block 118, the colony enumeration device can identify microorganisms and/or colony forming units of the microorganisms, using a deep learning model, in the culture device based on at least some of the plurality of enhanced images. Specifically, colony forming units can be identified for each microorganism species and colony forming units based upon a pre-training the deep learning model. For example, a first colony forming unit can be identified for a microorganism and a second colony forming unit can be identified for a different microorganism. Once identified, then the colony forming units can be counted (by the colony enumeration device or interaction component). As used herein, the deep learning model can refer to a pretrained deep learning model depending on the context. For example, in supervised machine learning, a pretrained deep learning model is configured to analyze images.

The deep learning model can be configured to analyze single images of a single-color channel or can analyze the plurality of enhanced images (e.g., combined image). The number of enhanced images can correspond to the bit-size of the resulting image, e.g., 16-bit, 24-bit, 32-bit, or 64-bit.

The deep learning model can use dedicated neural network circuitry that is distinct from the interaction component. For example, a single-board computer can have dedicated neural network circuitry as described further herein.

The deep learning model can be created using a machine learning framework configured to run on a neural network platform. In at least one embodiment, the deep learning model can be trained to identify a morphological characteristic of a colony forming unit (or select and identify one or more subtle colony morphological characteristics) in the image (or combined image). The deep learning model can be trained by a large sample of the variety of each colony type. The deep learning model can determine what morphological characteristic or characteristics to detect. This can include an important difference between image process, human guided training, and the unguided training. The deep learning model can be trained based on multiplicity of ground truth images having class labels identifying the morphological characteristic.

The deep learning model can be pre-trained/trained in a previous instance and the weights for the hidden layers can be included (e.g., weights of one or more artificial neurons in the hidden layer can be adjusted). The pretrained deep learning model is trained on a corpus of identified colony forming units of microorganisms. For example, the deep learning model can be trained using colony forming units that were identified by a human user without any assistance (such as zoom, enhancement, filtering, etc.). The deep learning model may be trained to miss some colony morphology characteristics that a human user would not be able to detect without assistance. Thus, the colony morphology characteristics identified by the deep learning model will approximate the human user. The deep learning model can determine a pixel range of the colony type and provide probabilities of the colony type being on the image.

The deep learning model can include a segmentation model such as regional proposal network combined with a classification model such as convolutional neural network (CNN). The segmentation model can segment the image into background and foreground, or non-colony forming unit and colony forming unit. The convolutional neural network can include an input layer, a plurality of hidden layers, and an output layer. The deep learning model does not include only one hidden layer unlike shallow machine learning models. Examples of the deep learning model include CNN, R-CNN, Fast R-CNN, Faster R-CNN. In at least one embodiment, the convolutional reduction of the image can be carried out by the Inception V2 convolutional neural network. The result is faster identification of colony forming units due to the common usage of convoluted data for the RPN and classifiers/area regressor/probability generation.

The deep learning model can be different from other machine learning where the deep learning model does not perform only directed feature extraction on an image from the plurality of images. For example, some current methods can use feature extraction which is extraction of directed and specific image characteristics guided by a user's attention through specific image processing. The machine learning operation can involve reducing the image via convolutions can be referred to as region-based feature extraction. The deep learning model can be trained to determine a large number of characteristics that can be beyond human recognition and uses these propose potential areas of foreground (colonies) and background (non-colonies) and is different from directed feature extraction.

In block 120, the colony enumeration device can provide the plurality of identification characteristics to the interaction component such that the interaction component can project at least some of the plurality of identification characteristics onto some of the plurality of enhanced images (or a combined image therefrom) that were previously transmitted. Although not pictured, the interaction component can receive the enhanced image from the colony enumeration device and can perform additional image processing. For example, the interaction component can display annotations of colony forming units on an image section.

The plurality of identification characteristics of the culture device for the interaction component can match to the combined image and be communicated to a user. Once matched, then the interaction component can provide a colony count and annotate the colony forming units with at least some of the plurality of identification characteristics, and receive additional input from the user to modify the colony count and/or provide reinforcement learning to the deep learning model.

In at least one embodiment, the colony enumeration device can deliver the colony forming unit count for each microorganism species, the x,y coordinates for each colonies center point, the x,y dimensions with probabilities of a specific class, or combinations thereof to the interaction component. If there is an error during the identification or feed, the interaction component can receive a status message indicating the error. The interaction component can display the results and any errors.

Figure 2:
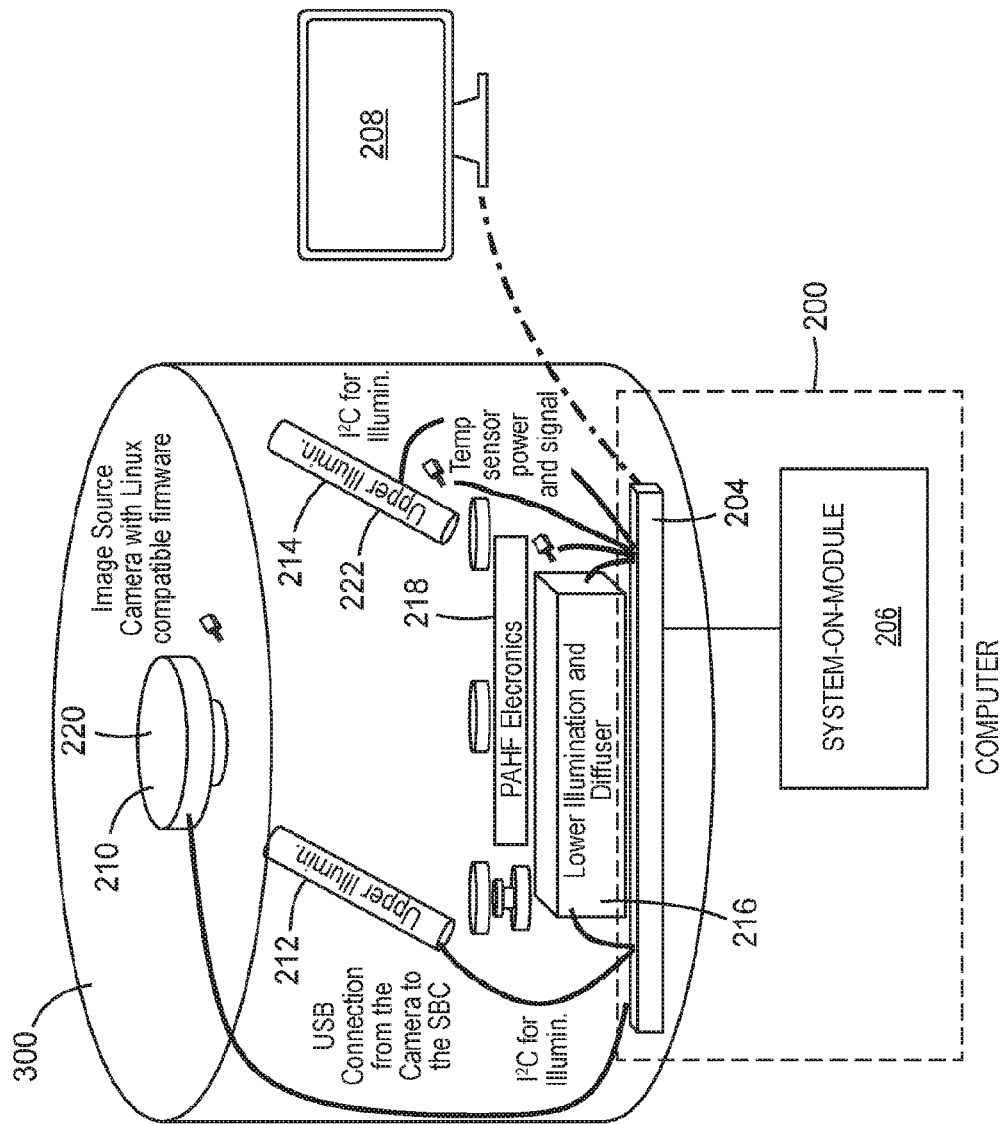
FIG. 2 illustrates a microorganic detection system 200 in accordance with one embodiment.

FIG. 2 illustrates a microorganic detection system 200 useful in the present disclosure. The microorganic detection system 200 can include a colony enumeration device 300 and interaction component 208 communicatively coupled to each other. In at least one embodiment, the interaction component 208 is connected via a serial connection (e.g., USB) to the colony enumeration device 300.

The colony enumeration device 300 can include a computer 202. The computer 202 is preferably a single-board computer. The computer 202 can include interface circuitry 204 and system-on-module 206. The interface circuitry 204 can be designed to couple to the system-on-module 206 and provide the various peripheral connections for the system-on-module 206. For example, the interface circuitry 204 can also include at least some $I^2C$ connections in a multichannel configuration. The interface circuitry 204 can be capable of linking together all of the various peripherals, and separating channels between the peripherals. For example, the illumination circuitry, feed mechanism 218, USB ports, and the image capture circuitry 220 can be connected (e.g., fixedly or releasably) to the interface circuitry 204.

The interface circuitry 204 can also include input output circuitry to support DMA over USB. The input output circuitry can also support DMA or programmed input output (PIO) communication for the camera 210 and interaction component 208. The interface circuitry 204 can also support multi-channel analog to digital conversion (e.g., for temperature sensors) and multiple digital inputs for binary sensors. In at least one embodiment, the interface circuitry 204 can also support digital counters that can be configured for measuring feed (yardsticks), for Pulse Width Modulation (PWM) based motor control and for driving state machine time and interrupt-based process control.

The interface circuitry 204 can be mated with the system-on-module 206 and the peripheral devices can access the system-on-module 206 functionality (such as the neural network circuitry). Examples of system-on-module 206 are commercially available from NVIDIA (Santa Clara, CA) under the trade designation Jetson (e.g., Models TX1, TX2, Nano, or Xavier).

Some exemplary features of the system-on-module 206 can include one or more multi-core processors, memory sufficient to hold images from camera 210 and non-volatile storage for codes and values. Additional features can include image enhancement circuitry (utilizing GPUs), neural network circuitry capable of using Compute Unified Device Architecture (CUDA) parallel computing, OpenCL, or SYCL.

The computer 202 can also run/host a small, compact configurable Operating System (OS) such as Linux, RTOS or other similar OS to ensure only the desired services are contributing to the resource load. Additionally, this operating system dedicated to the enumeration purpose can avoid third party updates to the OS, security, networking or other OS environmental factors which may slow (or stop) the identification of microorganisms process. Thus, the computer 202 is configured to run a low-resource operating system (e.g., using less than 512 MB of RAM) that is real-time. The low-resource operating system can be a light-weight Linux distribution (see e.g., https://en.wikipedia.org/wiki/Light-weight_Linux_distribution) that is stripped of real-time functions.

In at least one embodiment, the computer 202 can perform the image enhancement, the identification of colony forming units of microorganisms and provide the plurality of identification characteristics via PIO USB.

The image capture circuitry can include camera 210 and illumination circuitry 222. The camera 210 captures images of the culture device. The camera 210 can have Linux-compatible firmware that interfaces with the computer 202. The camera 210 also comprises a lens. In at least one embodiment, the camera 210 can connect via USB to the interface circuitry 204, supporting DMA.

The image capture circuitry 220 can include a camera 210 and controller circuitry that controls the camera 210. The camera 210 can be arranged to enhance resolution of any captured image of the culture device. For example, the camera 210 can maintain a focal distance on a culture device capture area. The camera 210 can capture an image of the culture device at the illumination setting. The image capture circuitry can upload the captured image directly into the memory via DMA causing the memory to receive the image. In at least one embodiment, the image held in the memory is not enhanced further until block 106 in FIG. 1.

The illumination circuitry 222 can include upper and lower illumination for the illumination setting for a culture device. The illumination circuitry 222 can include upper illumination devices (e.g., an illumination device 212, an illumination device 214), and at least one lower illumination device (e.g., an illumination device 216). The placement of the illumination circuitry 222 are configured not to interfere with image capture by the camera 210. The illumination circuitry 222 can be connected to the interface circuitry 204 via $I^2C$. In at least one embodiment, the image capture circuitry 220 can store the calibration LED values (32 dwords).

In one example, the computer 202 can receive configuration and action commands from the interaction component 208 via USB. The computer 202 can return the status of any command execution including error messages to the interaction component via USB PIO. Next, the computer 202 can control the illumination circuitry via $I^2C$ based on a requested capture type. The computer 202 can control the feed mechanism 218 (e.g., a power assisted handfeed (PAHF) motor) via digital (PWM) controls and potentially support motor drive through an onboard component. The computer 202 can gather the status of the feed mechanism 218 through digital input from a PAHF sensor. Next, the computer 202, via image capture circuitry, can control and capture an image using the camera 210 via USB DMA. The computer 202, via the image capture circuitry, can gather temperature information and potentially applies basic compensation to the image based on this temperature information. This compensation can be different from the image enhancement described herein.

The interaction component 208 can be a general-purpose computer that is separate from the colony enumeration device 300. In one example, the interaction component 208 can connect to the computer 202 (via interface circuitry 204) for control, status, image capture, and enumeration results. The interaction component 208 can also have a display device that allows a user to manage the user interface and control overall processing flow. In at least one embodiment, the interaction component 208 can send commands to the computer 202 to configure processes or to initiate actions and monitor status returned from the computer 202 to determine status/results from any action.

The interaction component 208 can receive an image (enhanced or non-enhanced) from the computer 202 via USB DMA and receive any deep learning-based colony enumeration result including an identification characteristic via USB PIO. The interaction component 208 can also perform selective image processing-based colony forming unit identification depending on the plate type. The interaction component 208 can also carry out display, storage and reporting functionality.

Figure 3:
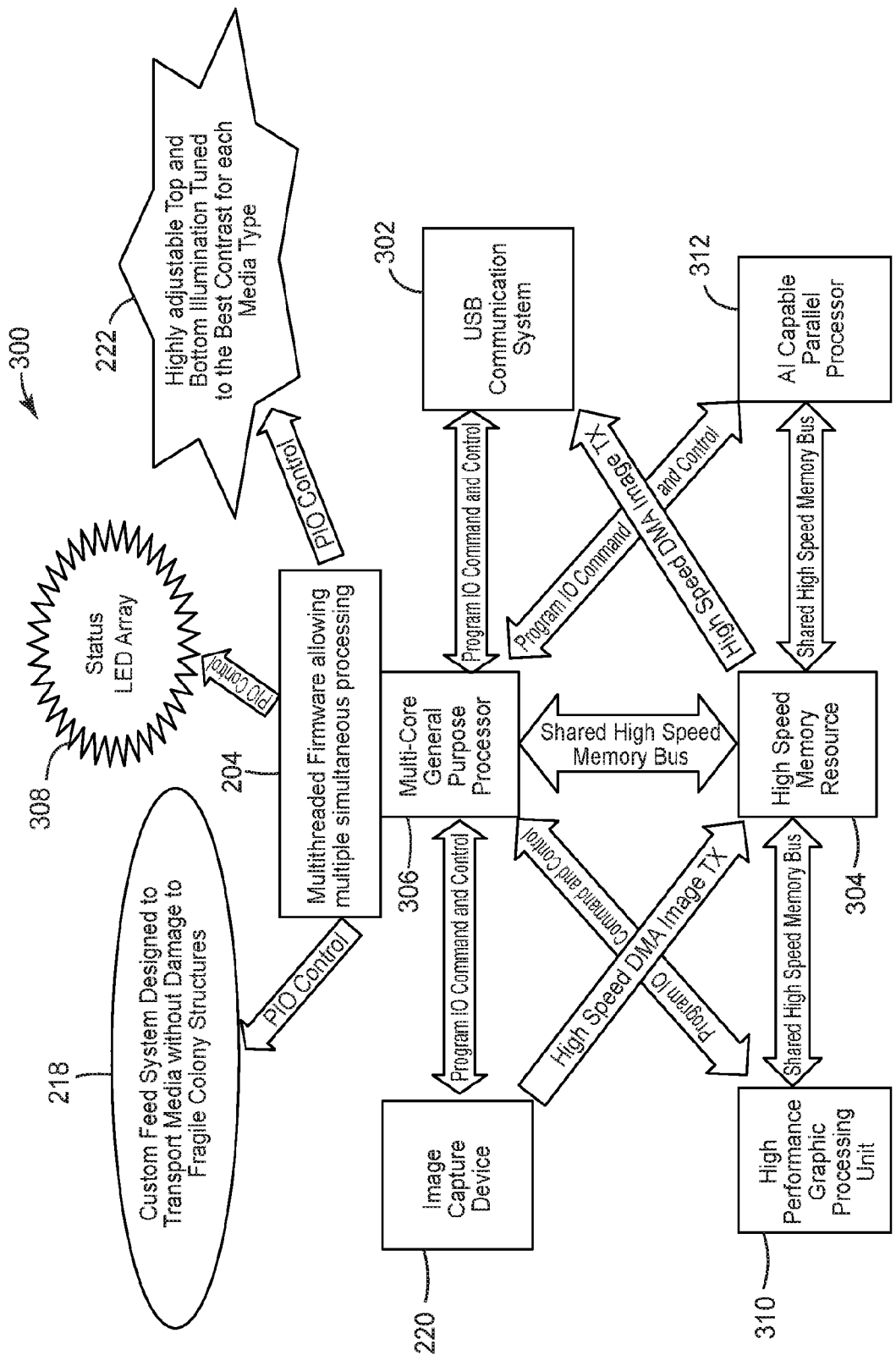
FIG. 3 illustrates a colony enumeration device 300 in accordance with one embodiment.

FIG. 3 illustrates a process diagram of various components of a colony enumeration device 300. The colony enumeration device 300 comprises an input output circuitry 302, a memory 304, an image capture circuitry 220, a processor 306, an interface circuitry 204, an illumination circuitry 222, an indicator 308, a feed mechanism 218, a graphic processing unit 310, and a neural network circuitry 312.

In at least one embodiment, the colony enumeration device 300 can have a single-board computer comprising the optional interface circuitry 204 and a system-on-module comprising input output circuitry 302, memory 304, processor 306 graphic processing unit 310, and neural network circuitry 312.

The interface circuitry 204 can be configured to separate the channels of the inputs and be configured to couple to the illumination circuitry 222, indicator 308, and feed mechanism 218. The indicator 308 can indicate to a user, the status of the illumination setting.

The single-board computer can include a memory 304, such as a high-speed memory including an interface that allows 1) cached access for efficient access by the multiple processors (e.g., processor 306, graphic processing unit 310, neural network circuitry 312, and individual cores thereof) and DMA for high-speed, and 2) low-processor overhead transfer of image data.

The single-board computer also includes a processor 306 that can be a multi-core general purpose processor. The processor 306 can be configured to control components, interlaces and coordinates, all functionality including image enhancement of the image, the deep learning model, and post-processing of the images for reporting identifications. A single process can ensure optimal coordination and peak performance. The processor 306 can be electrically coupled, via a shared memory bus, to the graphic processing unit 310, and neural network circuitry 312.

The memory bus can be configured to allow the processor 306, graphic processing unit 310, and neural network circuitry 312 access of program commands and data. The memory bus can also include arbitration for access of the memory 304 and caching for each of the processors to level the access loads. The memory bus can also allow DMA for sending the plurality of images to the memory from the image capture circuitry 220 or to/from the input output circuitry 302 without processor participation.

The graphic processing unit 310 can be configured to execute mathematical functions required for image enhancement described herein.

The neural network circuitry 312 can include a parallel processor with many smaller parallel processors that can carry out, simultaneously, the large amount of computations required for the use of the deep learning model for colony enumeration.

The input output circuitry 302 can connect to various peripheral devices. For example, the input output circuitry 302 can allow the single-board computer to connect to image capture circuitry 220, the feed mechanism 218, and an interaction component. The input output circuitry 302 can be configured to support USB (in both DMA and PIO modes).

The PIO command and control can be a slower, smaller interconnect used for the exchange of small commands or data for: communication, status, and identification data to/from an interaction component through the USB controller. The input output circuitry 302 can be configured to control and synchronization of the image capture; control/status of the image enhancement in the graphic processing unit 310; control/status of the neural network circuitry 312; on/off and brightness control of the illumination circuitry 222; synchronization, control, and status for the feed mechanism 218; and on/off and brightness/color control for the indicator 308.

Figure 4:
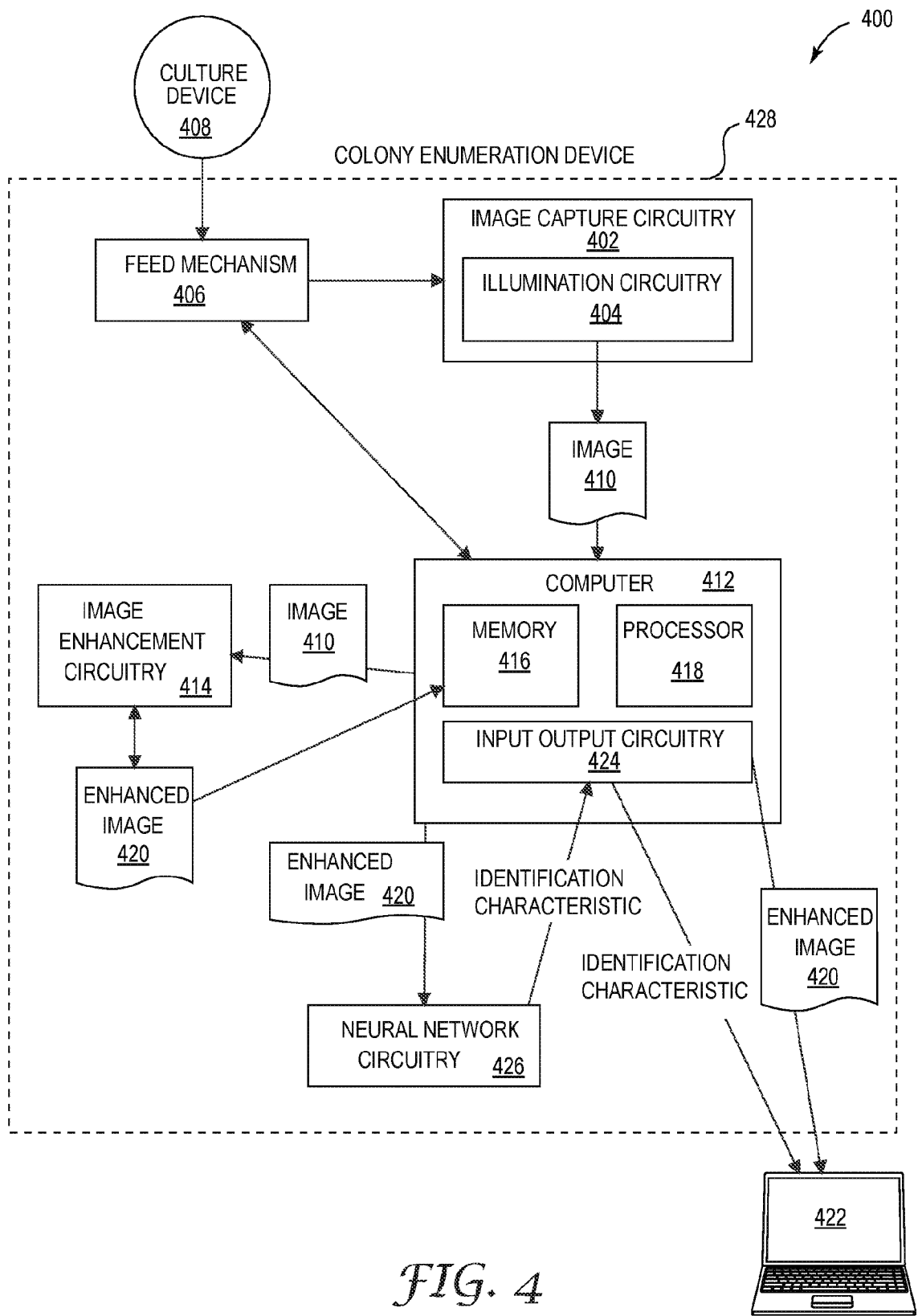
FIG. 4 illustrates a microorganic detection system 400 in accordance with one embodiment.

FIG. 4 illustrates a detailed overview of the microorganic detection system 400 performing the processes of method 100 of FIG. 1 using a single image as an example. The microorganic detection system 400 can include colony enumeration device 428 and interaction component 422.

Components of the colony enumeration device 428 such as the image capture circuitry 402, the illumination circuitry 404, the feed mechanism 406, the computer 412, the image enhancement circuitry 414, the memory 416, the processor 418, interaction component 422, input output circuitry 424, and neural network circuitry 426 are described in FIG. 2 and FIG. 3 above.

In at least one embodiment, a culture device 408 can be received by feed mechanism 406 as described in block 102.

The image capture circuitry 402 causes illumination circuitry 404 to illuminate the culture device 408 and capture an image 410 into memory 416 as described in block 106. The image capture circuitry 402 can use two or more colors of an illumination setting and each illumination setting corresponds to a color channel.

The image enhancement on image 410 can be performed by image enhancement circuitry 414 to form the enhanced image 420 as in block 108. The enhanced image 420 can be saved into the memory 416. The enhanced image 420 is provided to interaction component 422 via input output circuitry 424 as described in block 110. The enhanced image 420 can optionally be provided to neural network circuitry 426 for identification of microorganisms according to block 118.

In at least one embodiment, the enhanced image 420 (e.g., normalized) is set at individual colors to the interaction component 422 so that the longest task of transferring it to the interaction component 422 can be accomplished and the concurrent processing by copying each image to 1 or 3 bytes can be started. The enhanced image 420 can also be combined on the enumeration device for feeding to the deep learning model. The enhanced image 420 (as part of the combined image) can be the same combined image that is being sent to the deep learning model, so the results are traceable.

Figure 5:
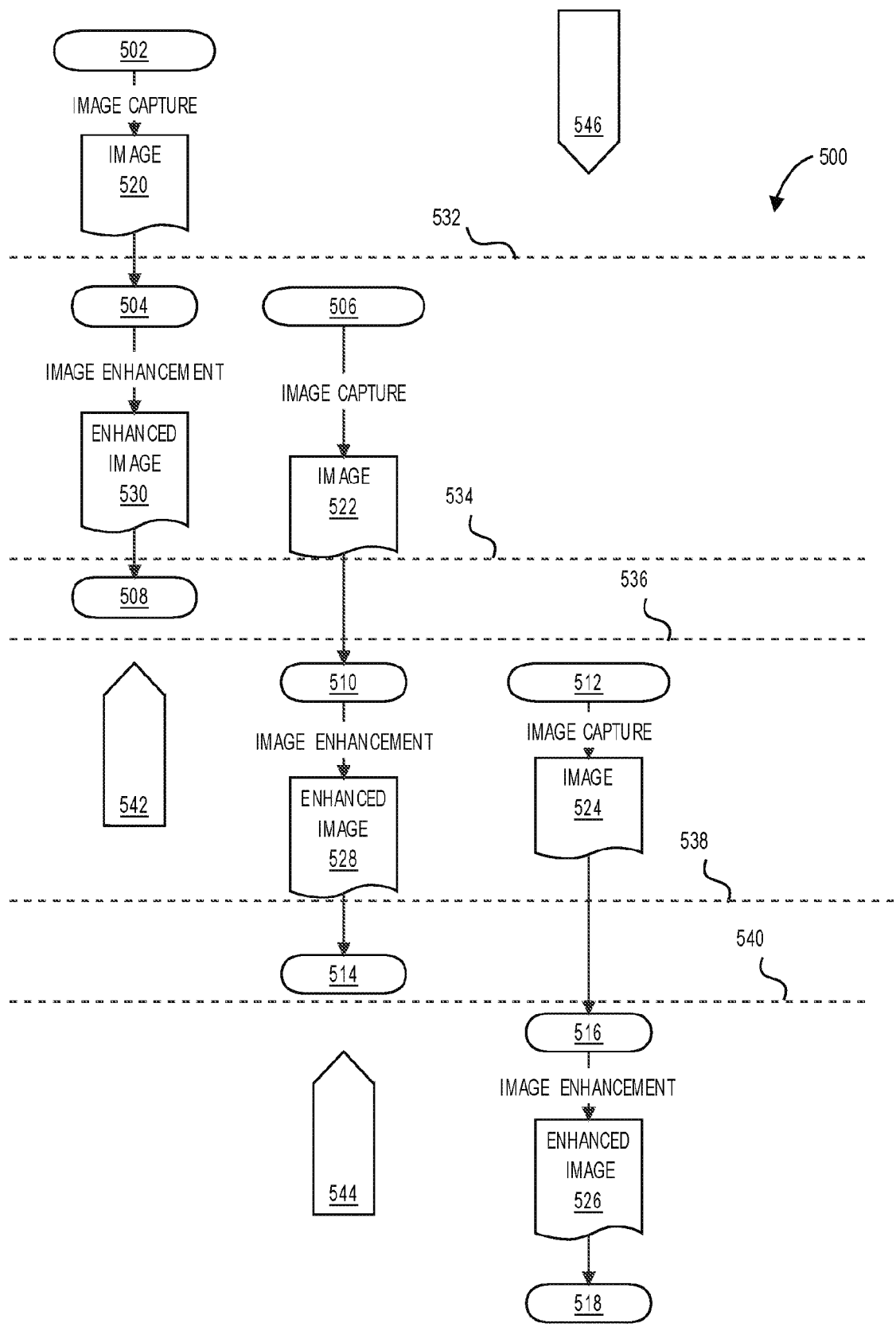
FIG. 5 illustrates a method 500 in accordance with one embodiment.

FIG. 5 illustrates a method 500 of concurrent processing of a plurality of images. Specifically, the method 500 can correspond to overlapped interleaved processing.

In method 500, the plurality of images taken at the plurality of illumination settings can correspond to a plurality of image instances (e.g., image instance 542, image instance 544, and image instance 546, which are all different from each other) for a culture device. As used herein, a subsequent image instance can occur after a prior image instance (e.g., image instance 544 is a subsequent image instance to image instance 542, and image instance 544 is a prior image instance to image instance 546). In at least one embodiment, each of the plurality of illumination settings is associated with an image instance. An image instance is related to the series of processing that occur for each illumination setting (e.g., at particular wavelengths of light). For example, block 106, block 108, block 110, and block 118 can all be processes for a single image instance. There may also be a sequence attributed to each image. For example, image 520 and image 524 can be taken from different lighting conditions in a particular order. Generally, image capturing any subsequent image (e.g., image 522 or image instance 544) of the sequence of images occurs in response to starting image enhancing of a prior image (e.g., image 520 or image instance 542) from the plurality of sequence of images stored in the memory.

With respect to image instance 542, the colony enumeration device can start image capture 502 by activating illumination circuitry to activate wavelength(s) of light or other lighting conditions. As a result, the image 520 gets captured. The image capturing can complete by time 532. The image capturing can include the time of being stored into the memory (e.g., via DMA).

The colony enumeration device can start image enhancement 504 of the image 520. The image enhancement can occur at some point after time 532. The colony enumeration device can initialize the image enhancement circuitry to perform a variety of operations described herein. As a result, the colony enumeration device can produce an enhanced image 530 at time 534 (thus block 108 from FIG. 1 is completed).

After the enhanced image 530 is formed, then the colony enumeration device can start transmission and optional analysis 508. In start transmission and optional analysis 508, the colony enumeration device can transmit enhanced image 530 to interaction component.

In at least one embodiment, the colony enumeration device can transmit an enhanced prior image from the sequence of enhanced images to the interaction component in response to a completion of image enhancing the prior image to form the enhanced prior image from the sequence of enhanced images.

In at least one embodiment, the colony enumeration device can wait to send all enhanced images as a combined image for the culture device to the neural network circuitry.

Optionally, the colony enumeration device can transmit to/be read by neural network circuitry for at least partial analysis after each enhanced image is processed. In at least one embodiment, at least some processes of the deep learning model are performed on the enhanced image 530 until the enhanced image 526 in the sequence of enhanced images is transmitted to the interaction component. For example, the regional proposal of one of the enhanced images 530 in one color channel can occur via an RPN while image instance 546 or image instance 544 is being processed.

When start image enhancement 504 begins (but not necessarily finishes), the colony enumeration device can start image capture 506 of image instance 544 to capture image 522. For example, the image enhancement of image 520 does not have to be completed when start image capture 506 occurs. Thus, the start image capture 506 can be based on (e.g., triggered by) start image enhancement 504.

In start image capture 506, the illumination circuitry can illuminate the culture device with a different illumination setting (i.e., different from start image capture 502 or start image capture 512) responsive to capturing image 520 or start image enhancement 504. For example, start image capture 506 can include any warmup sequence of the illumination circuitry. In another example, start image capture 506 could be based off of image 520 being saved into memory. In at least one embodiment, start image capture 506 can occur at the same time or after start image enhancement 504 (thus, start image enhancement 504 is prior to start image capture 506). After image capture, the memory can receive image 522 via direct memory access. The start image capture 506 can occur after time 532 and complete by time 534. In another example, the image 522 could be formed by time 536 and be concurrent with start transmission and optional analysis 508.

In at least one embodiment, start image enhancement 510 can be based on 1) completing start transmission and optional analysis 508, or 2) completing the formation of enhanced image 530. By time 538, multiple enhanced images (e.g., enhanced image 530 and enhanced image 528) can form a sequence of enhanced images. In at least one embodiment, the enhanced image 528 can be formed by time 538. Similar to start transmission and optional analysis 508, the colony enumeration device can start transmission and optional analysis 514 of enhanced image 528 corresponding to image instance 544.

Processing of image instance 546 can be similar to image instance 544. In image instance 546, a final image (i.e., image 524) in sequence of images can be captured. The start image capture 512 of image instance 546 can be based off of start image enhancement 510 from image instance 544. For example, the colony enumeration device can form image 524 after forming enhanced image 528 either before or after time 538. In another example, start image enhancement 516 occurs based off of enhanced image 528 or start transmission and optional analysis 514 in time 540.

In at least one embodiment, the colony enumeration device can form enhanced image 526 after start image enhancement 516. After enhanced image 526 is formed, then the colony enumeration device can start transmission and optional analysis 518 similar to start transmission and optional analysis 514 and start transmission and optional analysis 508.

In at least one embodiment, after enhanced image 526 is formed, then the neural network circuitry can begin identifying colony forming units of the microorganisms and the colony type. For example, the deep learning model can use 24-bit color images and may use all three enhanced images as a combined image. The sequence of enhanced images can be combined into the combined image. For example, enhanced image 530, enhanced image 528, and enhanced image 526 can be combined via interlacing, bytewise to form a 24-bit color combined image.

Figure 6:
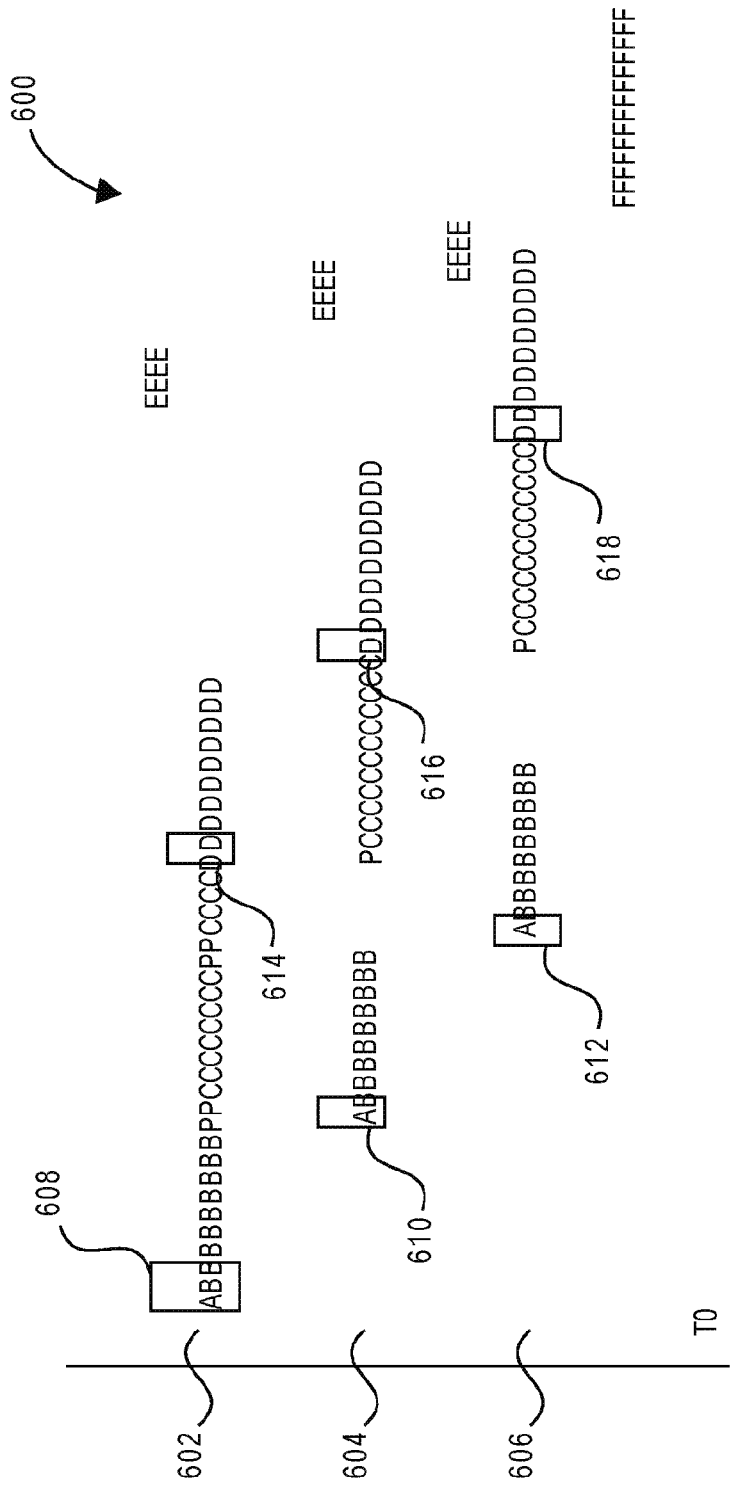
FIG. 6 illustrates a timing diagram 600 in accordance with one embodiment.

FIG. 6 illustrates an embodiment of a timing diagram 600 illustrating the overlapped interleaved processing of image instance 602, image instance 604, and image instance 606.

In at least one embodiment, overlapped interleaving can mean the hardware and firmware environment of the device is designed such the multiple dependent operations are carried out on multiple spectra can be run simultaneously and without contention for resources of the designed system.

For example, for Processes A, B, C, D, E, F, the processes can be configured to not use processor resources or communication channels or to be interruptible for setting up other processes.

In timing diagram 600, Process A can represent setting of the illumination. Process A may be configured to use minimum processor overhead during communication (e.g., writing a register that in turn sends out the I$^2$C command or data).

Process B can represent capturing an image. In at least one embodiment, Process B can be configured to use DMA to capture the image directly into memory without taking up process to move each byte from the camera to the system memory.

Process C can represent image enhancing the image. In at least one embodiment, process C can be configured to be interrupted during short periods of time needed for other functions like setting up the next illumination or setting up a DMA to send out the image to the interaction component.

Process D can represent sending the image to the interaction component. In one example, the transmission can be performed via DMA to copy the images to interaction component without the processor sending each by a communication controller (e.g., USB chip).

Process E can represent the process of creating a combined image (one byte of red, one of blue, and one of green in a row in memory for each pixel of the image). Process E can be configured to be lower priority than setting up any other of the processes that do not take processor time outside the setup of this process.

Process F can represent the identifying of the colony forming units on the combined image. Process F can be performed via neural network circuitry such that the main processor will not be loaded while setting up or carrying out other functions.

In at least one embodiment, timing diagram 600 can represent interlacing with time being across the page and each set of lines represent the processing of one spectrum. "P" represents a pause in a process to allow other items using a single resource, usually the processor. A space represents a process that cannot be started due to the need for a resource, usually the processor. Process 608, process 610, process 612, process 614, process 616, and process 618 can represent the starting up of a process that, one started, do not require processor resources. For example, all of process A, the start of process B, all of process C, the start of process D, all of process E, and the start of process use hardware resources. Beginning functions that can run on their own can take priority. After prioritizing functions that can run on their own, the next priority can be finishing process that occur earliest.

Figure 7:
FIG. 7 illustrates a method 700 in accordance with one embodiment.

FIG. 7 illustrates a diagnostic mode of a colony enumeration device. In the diagnostic mode, the image enhancement can be avoided. The method 700 can begin by the interaction component requesting capture of the raw image of a culture device and providing Pulse Width Modulation (PWM) and Global Balance (GB) values. The GB can represent the current running through all of the LED's generating a brightness that is then controlled by changing the duty cycle of off/on for shorter periods for darkening and longer periods for lightening. The interaction component can also request a capture of a normalized image and provide the percentage of normalized PWM.

Similar to block 106, the colony enumeration device can capture an image at an illumination setting. The illumination setting can depend on either the provided GB and PWM if a raw image was requested or the percentage of the calibrated PWM using the calibrated GB if a normalized image was requested. For example, the calibration can set the LED's brightness and normalization does a per pixels image adjustment. When a normalized image is requested, the percent of the calibrated LED PWMs is used.

In method 700, there is no identification of colony forming units after transmitting a plurality of images. For example, when the interaction component receives the last image, the interaction component can carry out any additional functionality to be done on the image.

Figure 8:
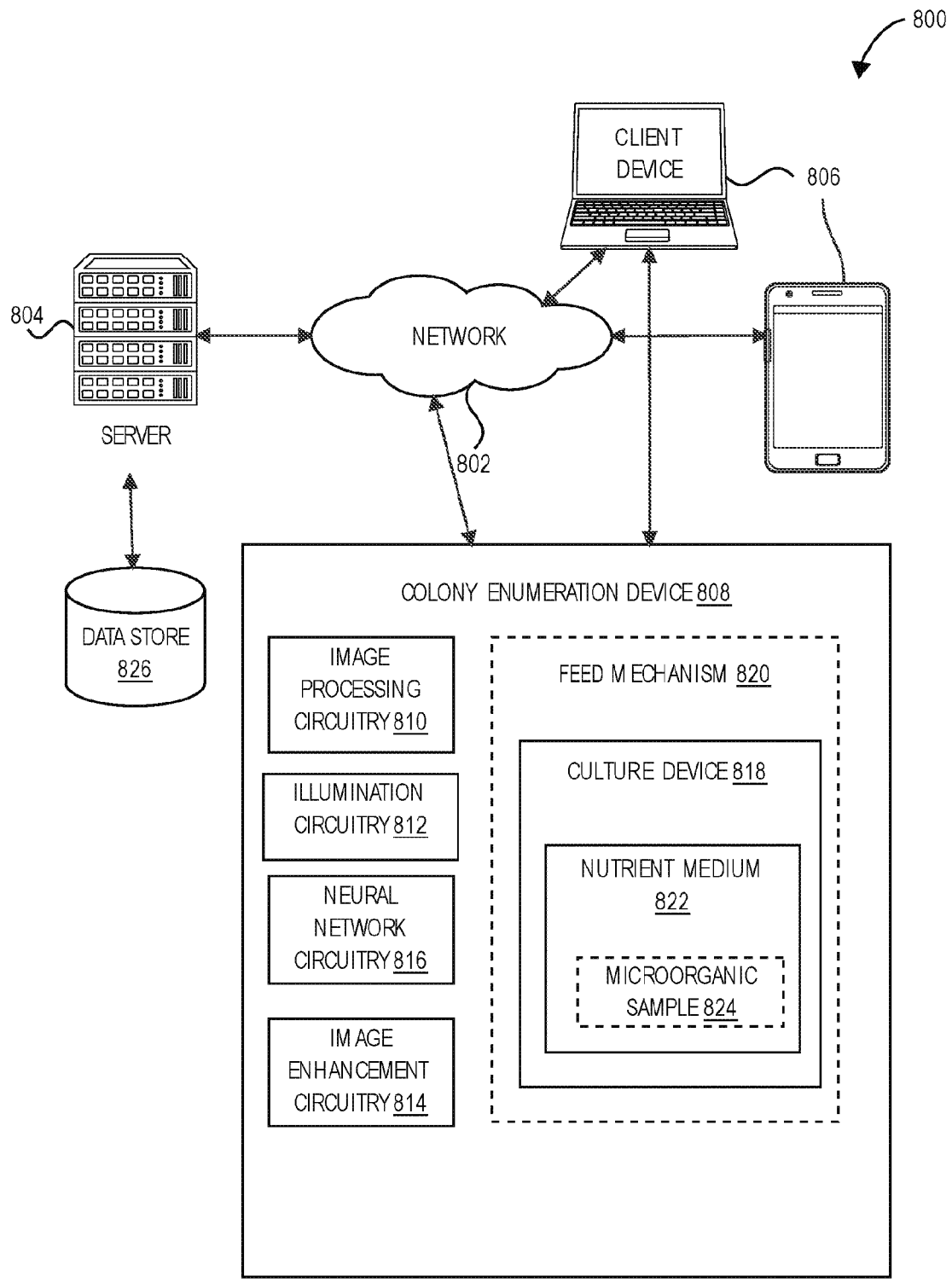
FIG. 8 illustrates a simplified microorganic detection system 800 in which a server 804 and a client device 806 are communicatively coupled via a network 802.

FIG. 8 illustrates a microorganic detection system 800 in which a server 804 and a client device 806 are connected to a network 802.

In various embodiments, the network 802 may include the Internet, a local area network ("LAN"), a wide area network ("WAN"), and/or other data network. In addition to traditional data-networking protocols, in some embodiments, data may be communicated according to protocols and/or standards including Bluetooth, power-line communication ("PLC"), and the like. In some embodiments, the network 802 may also include a voice network that conveys not only voice communications, but also non-voice data such as Short Message Service ("SMS") messages, as well as data communicated via various cellular data communication protocols, and the like.

In various embodiments, the client device 806 may include desktop PCs, mobile phones, laptops, tablets, wearable computers, or other computing devices that are capable of connecting to the network 802 and communicating with the server 804, such as described herein. The client device 806 can perform functions of the interaction component and the client device 806 can be an embodiment of an interaction component described herein.

In various embodiments, additional infrastructure (e.g., short message service centers, cell sites, routers, gateways, firewalls, and the like), as well as additional devices may be present. Further, in some embodiments, the functions described as being provided by some or all of the server 804 and the client device 806 may be implemented via various combinations of physical and/or logical devices. However, it is not necessary to show such infrastructure and implementation details in FIG. 8 in order to describe an illustrative embodiment. In at least one embodiment, the server 804 can be communicatively coupled to a data store 826 such that data from the client device 806 can be transmitted to the data store 826 through the server 804.

In at least one embodiment, the microorganic detection system 800 can include a colony enumeration device 808 that is communicatively coupled to the client device 806. Preferably, the colony enumeration device 808 is connected to the client device 806 so that the client device 806 can perform DMA on the memory of colony enumeration device 808 (e.g., using USB DMA protocols). The colony enumeration device 808 can be configured to read a culture device 818. In at least one embodiment, the colony enumeration device 808 can be directly connected to the client device 806 without the use of a network 802. Aspects of the user interface can be integrated onto the colony enumeration device 808 itself.

The colony enumeration device 808 can have multiple subsystems to aid in the reading of culture device 818. For example, the colony enumeration device 808 can include image processing circuitry 810 to capture images of the culture device 818, image enhancement circuitry 814 to enhance images, an optional neural network circuitry 816 to enumerate and classify colony forming units of the culture device 818, and an optional feed mechanism 820 to automatically feed multiple culture devices 1314 without user intervention. The image processing circuitry 810 can be configured to provide the images to the client device 806 for analysis. The image processing circuitry 810 can work in conjunction with illumination circuitry 812. The illumination circuitry 812 can include various lights and controllers to illuminate the culture device to be captured by the image processing circuitry 810.

The culture device 818 can have growth compartment having a nutrient medium 822 contained therein. A microorganic sample 824 can be obtained from a sample of interest such as a food sample. The microorganic sample 824 can be applied to nutrient medium 822 such that the microorganism can proliferate.

Figure 9:
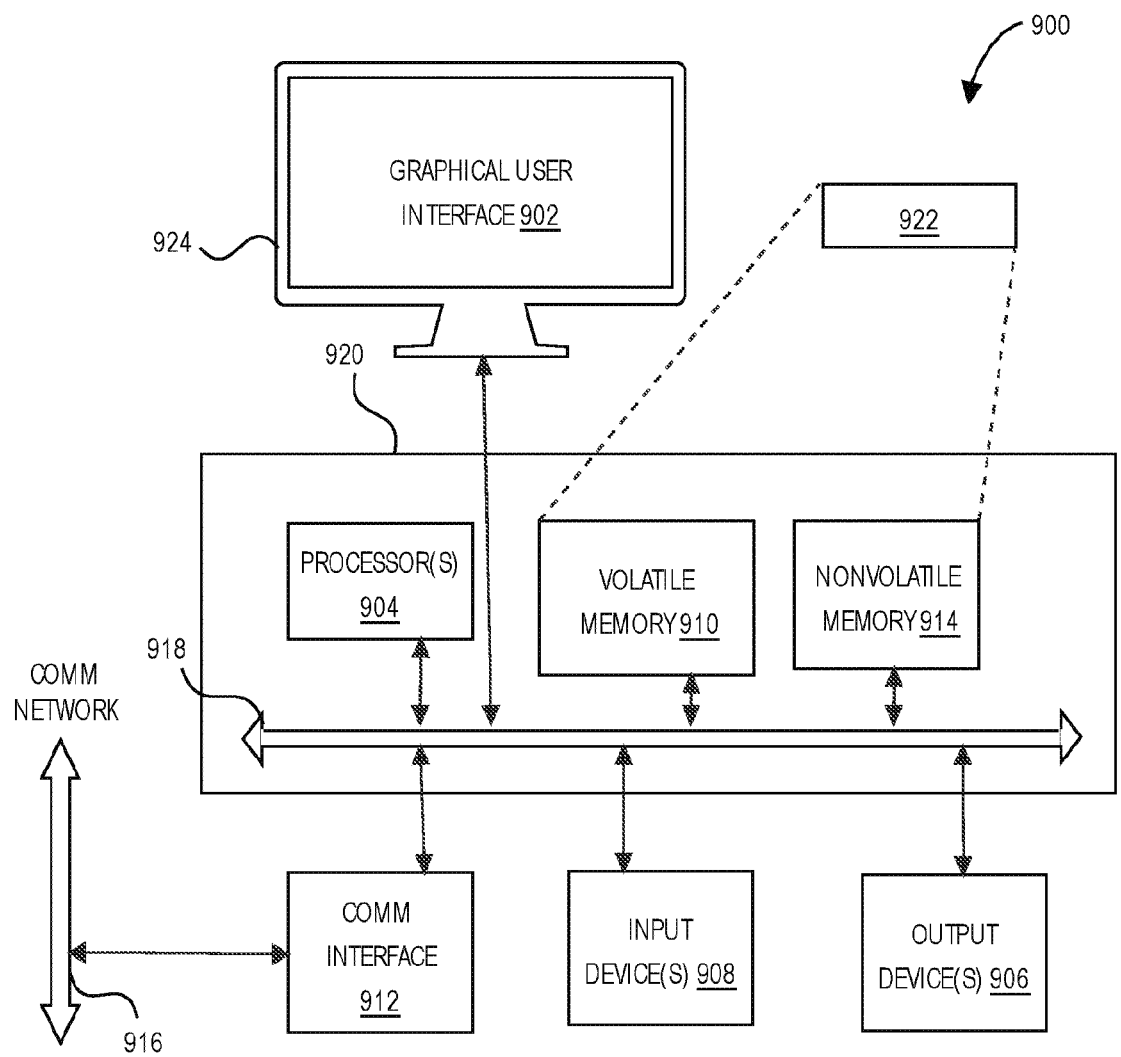
FIG. 9 is an example block diagram of a computer 900 that may incorporate embodiments of the present disclosure.

FIG. 9 is an example block diagram of a computer 900 that may incorporate embodiments of the colony enumeration device and/or interaction component of the present disclosure. FIG. 9 is merely illustrative of a machine system to carry out aspects of the technical process described herein, and does not limit the scope of the claims. One of ordinary skill in the art would recognize other variations, modifications, and alternatives. In one embodiment, the computer 900 typically includes a graphical user interface 902, a data processing system 920, a communication network interface 912, input device(s) 908, output device(s) 906, and the like.

As depicted in FIG. 9, the data processing system 920 may include one or more processor(s) 904 that communicate with a number of peripheral devices via a bus subsystem 918. These peripheral devices may include input device(s) 908, output device(s) 906, communication network interface 912, and a storage subsystem, such as memory (e.g., a volatile memory 910 and a nonvolatile memory 914).

The volatile memory 910 and/or the nonvolatile memory 914 may store computer-executable instructions and thus forming logic 922 that when applied to and executed by the processor(s) 904 implement embodiments of the process disclosed herein.

The input device(s) 908 include devices and mechanisms for inputting information to the data processing system 920.

These may include a keyboard, a keypad, a touch screen incorporated into the graphical user interface 902, audio input devices such as voice recognition systems, microphones, and other types of input devices. In various embodiments, the input device(s) 908 may be embodied as a computer mouse, a trackball, a track pad, a joystick, wireless remote, drawing tablet, voice command system, eye tracking system, and the like. The input device(s) 908 typically allow a user to select objects, icons, control areas, text and the like that appear on the graphical user interface 902 via a command such as a click of a button or the like.

The output device(s) 906 include devices and mechanisms for outputting information from the data processing system 920. These may include the display device 924 configured to display/project/present the graphical user interface 902, speakers, printers, LEDs, and so on as well understood in the art.

The communication network interface 912 provides an interface to communication networks (e.g., communication network 916) and devices external to the data processing system 920. The communication network interface 912 may serve as an interface for receiving data from and transmitting data to other systems. Embodiments of the communication network interface 912 may include an Ethernet interface, a modem (telephone, satellite, cable, ISDN), (asynchronous) digital subscriber line (DSL), FireWire, USB, a wireless communication interface such as Bluetooth or WiFi, a cellular interface, and the like.

The communication network interface 912 may be coupled to the communication network 916 via an antenna, a cable, or the like. In some embodiments, the communication network interface 912 may be physically integrated on a circuit board of the data processing system 920, or in some cases may be implemented in software or firmware, such as "soft modems", or the like. The communication network 916 can further be communicative coupled to the colony enumeration device as described herein.

The computer 900 may include logic that enables communications over a network using protocols such as HTTP, TCP/IP, RTP/RTSP, IPX, UDP and the like.

The volatile memory 910 and the nonvolatile memory 914 are examples of tangible media configured to store computer readable data and instructions to implement various embodiments of the process described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 910 and the nonvolatile memory 914 may be configured to store the basic programming and data constructs that provide the functionality of the disclosed process and other embodiments thereof that fall within the scope of the present disclosure.

Logic 922 that implements embodiments of the present disclosure may be stored in the volatile memory 910 and/or the nonvolatile memory 914. Said logic 922 may be read from the volatile memory 910 and/or nonvolatile memory 914 and executed by the processor(s) 904. The volatile memory 910 and the nonvolatile memory 914 may also provide a repository for storing data used by the logic 922.

The volatile memory 910 and the nonvolatile memory 914 may include a number of memories including a main random-access memory (RAM) for storage of instructions and data during program execution and a read only memory (ROM) in which read-only non-transitory instructions are stored. The volatile memory 910 and the nonvolatile memory 914 may include a file storage subsystem providing persistent (non-volatile) storage for program and data files. The volatile memory 910 and the nonvolatile memory 914 may include removable storage systems, such as removable flash memory.

The bus subsystem 918 provides a mechanism for enabling the various components and subsystems of data processing system 920 communicate with each other as intended. Although the communication network interface 912 is depicted schematically as a single bus, some embodiments of the bus subsystem 918 may utilize multiple distinct busses.

It will be readily apparent to one of ordinary skill in the art that the computer 900 may be a device such as a smartphone, a desktop computer, a laptop computer, a rack-mounted computer system, a computer server, or a tablet computer device. As commonly known in the art, the computer 900 may be implemented as a collection of multiple networked computing devices. Further, the computer 900 will typically include operating system logic (not illustrated) the types and nature of which are well known in the art.

EXAMPLES

The Example and Comparative Examples were set up according to Table 1.

TABLE 1

| Overview of set up | | | | |
| --- | --- | --- | --- | --- |
| Colony enumeration device | Operating System | Neural Network Platform | Computer | Concurrent Processing? |
| Example 1 | Ubuntu v. 16.04 LTS | TensorFlow 1.13.1 | NVIDIA Jetson TX2 | Yes |
| Comparative Example 1 | Ubuntu v. 16.04 LTS | TensorFlow 1.13.1 | NVIDIA Jetson TX2 | No |
| Comparative Example 2 | Windows 10, Service Pack 1 | TensorFlow 1.13.1 | Intel 15 Gen. 6, 16 GB RAM, 512 MN level 2 cache | No |

Example 1 was carried out with dedicated hardware and software running on an embedded NVIDA Jetson TX2. The configuration of the single-board computer with respect to the peripheral components is described on FIG. 2 and FIG. 3. The operating system was a custom build of Ubuntu (Ver 16.04 LTS) stripping out all Bluetooth, Ethernet, WiFi, graphics support features. Overlapped interleaved processing as described in FIG. 6 was performed.

Comparative Example 1 used the same physical hardware as Example 1, but did not use concurrent processing. For example, each of the steps were carried out fully for each image before moving on to the next. DMA capture of the image from the camera and DMA USB out to the external computer was not implemented at this point. The all operations except for the parallel processing of the deep learning model were carried out by the main processor.

Comparative Example 2 used a different operating system and computer. Comparative Example 2 shows the setup of an external computer connected to the colony enumeration device. The camera was connected to the computer via USB, the illumination circuitry was connected via USB I²C, the feed mechanism control came from the computer via USB with the feed and status generated by custom hardware and communicated via USB. All unnecessary services such a network, virus checking, and any other functional processes were shutdown.

Example 1, Comparative Example 1, and Comparative Example 2 all used the same deep learning model. The deep learning model was a Faster RCNN structure with Inception V2 convolutional network to generate the reduced image info for both the Regional Proposal Network and the Classifier. A cropped, downscaled RGB image and one to three output classifications was used as an input to the Faster RCNN.

Performance Measurement:

The performance measurements were carried out by digitally providing the same 100 images of colony forming units each on an enterobacteriaceae count plate type, 100 images of colony forming units on a E. Coli/coliform count plate type, and 100 images of colony forming units on a rapid aerobic count plate type commercially available from 3M under the trade designation Petrifilm. The same images were used for Example 1, Comparative Example 1, and Comparative Example 2.

Each aspect of the process was timed (preprocessing, AI, post processing, and output) was timed for each culture device. The total of all the processes (using the 300 images) were then summed and divided by the number of images to generate the average time. The size and relative location (aligned via fiducials) were the same for all methods to make sure accuracy of the methods matched. The results are shown on Table 2.

TABLE 2

Results of the Performance Measurement

| Colony enumeration device | Average Time |
|---|---|
| Example 1 | 6 seconds |
| Comparative Example 1 | 8 seconds |
| Comparative Example 2 | 30 seconds |

Definitions

"Artificial intelligence" refers to the theory and development of computer systems able to perform tasks that normally require human intelligence, such as visual perception, speech recognition, decision-making, and translation between languages. Broader than machine learning.

"Circuitry" refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out process or devices described herein, or a microprocessor configured by a computer program which at least partially carries out process or devices described herein), circuitry forming a memory device (e.g., forms of random access memory), or circuitry forming a communications device (e.g., a modem, communications switch, or optical-electrical equipment).

"Colony count" refers to a count of colony forming units for each microorganism type.

"Colony enumeration device" refers to an instrument used to detect biological events of samples on culture device. Examples of plate readers can include thin-film plate readers such as the 3M Petrifilm Colony enumeration device or other agar-based plate readers.

"Colony forming unit" refers to a unit used in microbiology to estimate the number of microorganisms in a sample.

"Colony morphology characteristic" refers to one or more forms of microorganisms that identify a microorganism or colony forming unit thereof in the culture device.

"Colony type" refers to a class or species of microorganism associated with a colony forming unit. The colony type can be determined partially by the colony morphology characteristic of the colony forming unit.

"Combined image" refers to an image that is comprised of a plurality of images from the different color channels. The color channels can be interleaved. Examples of combined images include RGB images.

"Concurrent" refers to concurrent processing, Processes can be both concurrent and in parallel. Interleaving can be one technique that leads to concurrent processing.

"Concurrent processing" refers to processing where several computations are executed concurrently during distinct or overlapping time periods.

For example, concurrent process can be executed on one core by interleaving the execution steps of each process via time-sharing slices. If an original process does not complete during its time slice, then the original process can be paused, another process begins or resumes, and then later the original process can be resumed.

In another example, concurrent processing can also include process lifetimes overlapping. Concurrent computations may be executed in parallel. For example, by assigning each process to a separate processor, processor core, or hardware channel (e.g., DMA), or distributing a computation across a network.

"Concurrently" refers to the adverb of concurrent.

"Corpus" refers to a collection of images in machine-readable form, assembled for the purpose of identifying colony forming units of microorganisms. The corpus can include identified colony forming units that are associated with known microorganisms.

"Culture device" refers to an article adapted to house a nutrient medium that facilitates the growth of a microorganism. Optionally, the culture device may comprise a lid or cover to minimize the exposure of the nutrient medium to external contamination and/or to reduce the loss of moisture from the culture medium during incubation and/or storage. The culture device can have a growth compartment and nutrient medium contained within the culture device. A microorganic sample can be received in the growth compartment. Nonlimiting examples of culture devices include flasks, beakers, tubes, Petri dishes, multi-well plates, PETRIFILM plates, COMPACT DRY media sheets, SANITA-KUN sheets, and the like. The culture device can be agar plates or an all-in-one plating system such as 3M Petrifilm. Articles of the present disclosure include thin film culture devices, such as those disclosed in U.S. Pat. Nos. 4,476,226; 5,089,413, and 5,232,838; which are incorporated herein by reference in their entirety.

"Deep learning model" refers to part of a broader family of machine learning methods based on artificial neural networks with representation learning. Learning can be supervised, semi-supervised or unsupervised. Most modern deep learning models are based on artificial neural networks, specifically, Convolutional Neural Networks (CNN)s, although they can also include propositional formulas or latent variables organized layer-wise in deep generative models such as the nodes in deep belief networks and deep Boltzmann machines. Deep learning model differs from an artificial neural network in that an artificial neural network includes one hidden layer whereas a deep learning model includes two or more hidden layers.

"Different microorganism" refers to a second genus or species of microorganism.

"Direct memory access" refers to a feature of computer systems that allows certain hardware subsystems to access main system memory (random-access memory), independent of the central processing unit (CPU). This can be distinct from Programmed input-output (PIO). DMA can be implemented in a variety of ways, e.g., external controller, internal memory controller, embedded in the system integration module in the processor, etc.

"Extent" refers to the size or scale of a colony forming unit. The extent can refer to a radial dimension from a center point of a colony forming unit. If the region is a square/rectangle, then the extent can refer to an x-dimension across and a y-dimension up/down covering a square/rectangle.

"External computer" refers to a computer that is attached to and/or distinct from the colony enumeration device. The external computer can be configured to allow a user to interact with images of the culture device. The external computer can have a separate processor and memory from the colony enumeration device. The external computer can also be capable of implementing a deep learning model.

"Feature extraction" refers to reducing dimensionality by which an initial set of raw data is reduced to more manageable groups for processing to remove irrelevant or redundant features. In image processing, "directed feature extraction" can include edge detection, corner detection, blob detection, ridge detection, scale-invariant feature transform, template matching, Hough transform, etc. In some deep learning models, the "region-based feature extraction" can be carried out by extracting various size anchor boxes covering an entire image and running a CNN with trained kernel values to allow the deep learning model to extract the subtle characteristics to indicate the classes trained.

"Feed mechanism" refers to refers to an attachment for facilitating the transfer of a culture device into the colony enumeration device so that the colony enumeration device can capture an image of the culture device. The feed mechanism can include one or more servos and controllers to load the culture device. In at least one embodiment, the feed mechanism can be an autoloader attachment that loads a sequence of culture devices sequentially without user intervention.

"Firmware" refers to software logic embodied as processor-executable instructions stored in read-only memories or media.

"Growth compartment" refers to the space in which the microorganisms grow. The growth compartment can include the nutrient medium, the microorganic sample, and the volume of air around them.

"Hardware" refers to logic embodied as analog or digital circuitry.

"Identification characteristic" refers to a characteristic relating to an identity and/or location of one or more colony forming units on a culture device. The identification characteristic can include a probability of the colony forming unit being a colony type, the microorganism associated with the colony forming unit, coordinates (e.g., x, y) of the center point of a colony forming unit, and/or the extent (e.g., dimension x and dimension y) of the colony forming unit.

"Image" refers to an image of the culture device. Can include either the microorganic sample or can be a reference.

"Image enhancement" refers to mathematical techniques to improve quality of an image for automated image analysis systems. Additional techniques are further described on Raman B Paranjape, Handbook of Medical Imaging, Biomedical Engineering, page 3 (2000).

"Image instance" refers to an image captured using an illumination setting and having one or more subsequent process performed thereon.

"Image section" refers to part of a page that displays the image and any annotations. The user can interact with the image section to create annotations or modify existing annotations.

"In parallel" refers to parallel processing two separate computing functions

"Interaction Component" refers to a module to facilitate user interaction with a combined image and the identities of the colony forming units. "Interaction component" can refer to an integrated module on the colony enumeration device or the external computer if the interaction component is detached and distinct from the colony enumeration device.

"Interface circuitry" refers to application-specific connectivity and multimedia interfaces that is designed to pair with a system-on-module.

"Logic" refers to machine memory circuits, non-transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Machine learning" refers to computer algorithms that improve automatically through experience. Subset of artificial intelligence.

"Microorganic sample" refers to a sample having microorganisms. Bacterial species of interest can be analyzed in a microorganic sample that may be derived from any source, such as a physiological fluid, e.g., blood, saliva, ocular lens fluid, synovial fluid, cerebral spinal fluid, pus, sweat, exudate, urine, mucus, mucosal tissue (e.g., buccal, gingival, nasal, ocular, tracheal, bronchial, gastrointestinal, rectal, urethral, ureteral, vaginal, cervical, and uterine mucosal membranes), lactation milk, feces or the like. Further, the sample may be derived from a body site, e.g., wound, skin, anterior nares, nasopharyngeal cavity, nasal cavities, anterior nasal vestibule, scalp, nails, outer ear, middle ear, mouth, rectum, vagina, axilla, perineum, anus, or another similar site. Besides physiological fluids, other microorganic sample may include other liquids as well as solid(s) dissolved or suspended in a liquid medium. Samples of interest may include process streams, water, food, food ingredients, beverages, soil, plants or other vegetation, air, surfaces (e.g., walls, floors, equipment, utensils in a manufacturing plant, hospital, clinic, or home, for example), and the like. Preferably, the microorganic sample can be collected via a food matrix via a swab or direct contact with the bearing surfaces.

"Microorganism" refers to a microscopic organism such as a bacteria, virus, fungus, yeast, or mold. The term microorganism can also refer to a microorganism that is targeted to be analyzed such as a microorganism bacteria that causes disease, preferably those commonly associated with food contamination, including, for example, aerobic bacteria, *E. coli*, coliforms, enterobacteria, yeast, mold, *Staphylococcus aureus*, *Listeria*, *Campylobacter*, *Shigella*, *Salmonella*, and the like.

"Nutrient medium" refers to a solid, liquid or semi-solid designed to support the growth of microorganisms or cells. The nutrient medium typically comprises at least one nutrient selected from the group consisting of a meat peptone, a casein peptone, a gelatin peptone, a soy peptone, a beef extract, a yeast extract, lactose, glucose, dextrose, tryptose, galactose, tryptone, a fat, a mineral, or a vitamin. The nutrient medium also can include chemical elements to suppress undesirable growth, encourage desirable growth, and indicators of specific biological condition or by-products to color or otherwise highlight the organisms to be counted.

"Overlapped interleaved processing" refers to a processing technique where multiple process are interleaved in time and overlapped. The technique is described further by Jinzhong Niu at http://www.sci.brooklyn.cuny.edu/~jniu/teaching/csc33200/files/1007-Concurrency01.pdf. Overlapped interleaved processing is broadly defined as concurrent processing but has elements of parallel processing.

In overlapped interleaved processing, dependencies are being managed despite common resource usage in some parts of the process.

"Parallel processing" refers to a mode of computer operation in which a process is split into parts that execute simultaneously on different processors or specialized hardware attached to the same computer. In parallel processing, the execution occurs at the same physical instant.

"Pretrained deep learning model" refers to a deep learning model that has been trained on a corpus of identified colony forming units of microorganisms and colony morphology characteristics thereof. The training of the deep learning model can be performed at the colony enumeration device (by a user), by a manufacturer of the colony enumeration device, or by a third-party on behalf of or independent from the manufacturer. The term "pretrained" is intended as an adjective and is descriptive. The term "pretrained" is not intended to indicate a verb or process step unless specified.

"Plate type" refers to properties of a culture device that allows the culture device to proliferate selected microorganisms. Some plate types are non-specific to the species. Others, like the lactic acid plates, are specific to the genus but not the species.

"Reading" refers to capturing sample data relating to the culture device. This can be performed by optical means (e.g., an image processing circuitry). The term "read" can be used to refer to the act of obtaining a reading. The reading can be performed by the colony enumeration device at the direction of the computer. The term "reading" can be associated with the term "capturing". "Capturing" can refer to an act of the colony enumeration device. The term "reading" can also include the analysis performed on the sample data whether the analysis is performed on the colony enumeration device or computer.

"Sample data" refers to data from a reading of a culture device from a colony enumeration device. The sample data can include images from the culture device or other data concerning the reading of the culture device.

"Sequence of culture devices" refers to a processing order of culture devices by the colony enumeration device.

"Sequence of images" refers to a processing order of a plurality of images obtained from a culture device at a single incubation instance. The sequence of images refers to images captured at different illumination settings successively. For example, a second image can be captured no greater than 30, 15, 10, or 6 seconds after a first image.

The sequence of images does not refer to images with time to allow for additional visible growth of the microorganisms. The sequence of images does not allow the culture device to be incubated between images.

"Single-board computer" refers to a computer built on a single circuit board or other electrical substrate. Single-board computer can refer to a combination where a system-on-module or computer-on-module is plugged into interface circuitry.

"Software" refers to logic implemented as processor-executable instructions in a machine memory (e.g., read/write volatile or nonvolatile memory or media).

"Some" refers to an amount that is less than all

"System-on-module" refers to a board-level circuit that integrates a system function in a single module. It may integrate digital and analog functions on a single board. System-on-module can connect to interface circuitry to communicate with peripherals.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise. The terms "comprises" and variations thereof do not have a limiting meaning where these terms appear in the description and claims.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, "a", "an", "the", "at least one", and "one or more" are used interchangeably. Thus, for example, a nutrient can be interpreted to mean "one or more" nutrients.

The term "and/or" means one or all of the listed elements or a combination of any two or more of the listed elements.

Also herein, the recitations of numerical ranges by endpoints include all numbers subsumed within that range (e.g., 1 to 5 includes 1, 1.5, 2, 2.75, 3, 3.80, 4, 5, etc.).

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to or combined, without limiting the scope to the embodiments disclosed herein.

LIST OF ILLUSTRATIVE EMBODIMENTS

1. A method of colony enumeration, comprising:
    identifying colony forming units of microorganisms in a combined image using a deep learning model on a colony enumeration device; and
    providing a plurality of identification characteristics of the colony forming units to an interaction component such that the interaction component can project at least some of the plurality of identification characteristics onto the combined image.

1a. The method of embodiment 1, wherein the deep learning model is a pretrained deep learning model.

1b. The method of embodiment 1a, further comprising training the deep learning model on a corpus of identified colony forming units of microorganisms and colony morphology characteristics thereof to form the pretrained deep learning model.

1c. The method of any of the preceding embodiments, wherein using a deep learning model comprises providing the combined image to the deep learning model and receiving identified colony forming units of microorganisms from the deep learning model.

1d. The method of any of the preceding embodiments, wherein the (pretrained) deep learning model is pre-trained on a corpus of identified colony forming units of microorganisms and colony morphology characteristics thereof.

1e. The method of any of the preceding embodiments, wherein the deep learning model uses (or receives as an input) a corpus of identified colony forming units of microorganisms and colony morphology characteristics thereof.

1f. The method of any of the preceding embodiments, wherein the deep learning model is configured to receive a corpus of identified colony forming units of microorganisms and colony morphology characteristics thereof to form the pretrained deep learning model.

2. The method of embodiment 1, further comprising:
   image capturing, with image capture circuitry, a culture device at a plurality of illumination settings to form a plurality of images,
   image enhancing, with the image enhancement circuitry, the plurality of images to form a plurality of enhanced images.

2a. The method of embodiment 2, wherein the image capturing process and image enhancing process occur concurrently for different image instances.

2b. The method of embodiment 2 or 2a, further comprising transmitting of the plurality of enhanced images to the interaction component using direct memory access, wherein the image capturing process and the transmitting to the interaction component process occur using overlapped interleaved processing.

2c. The method of embodiment 2b, wherein the interaction component is an external computer.

3. The method of embodiment 2, wherein the combined image is formed from at least some of the plurality of enhanced images that were previously transmitted.

4. The method of any of embodiments 2 to 3, wherein image enhancing some of the plurality of images occurs concurrent with image capturing the culture device at some of the plurality of illumination settings.

5. The method of any of embodiments 2 to 4, wherein the interaction component is configured to form a second combined image from the plurality of enhanced images that were previously transmitted, the second combined image is a duplicate of the combined image that is used in the deep learning model.

6. The method of any of embodiments 2 to 5, further comprising:
   receiving an indication from a feed mechanism that the culture device has been inserted and is in position; and
   image capturing the culture device in response to receiving the indication.

7. The method of embodiment 6, further comprising:
   actuating a pressing mechanism to flatten the culture device in response to the indication.

8. The method of any of embodiments 2 to 7, wherein the image enhancing process comprises flat field normalization, convolutions, sharpening, histogramic equalization, contrast enhancements, and combinations thereof.

9. The method of any of embodiments 2 to 8, wherein an illumination setting from the plurality of images is associated with an illumination setting from the plurality of illumination settings.

10. The method of embodiment 9, wherein the illumination setting optically enhances a color channel.

11. The method of any of embodiments 2 to 10, wherein an illumination setting is at least partially determined by illumination circuitry.

12. The method of any of embodiments 2 to 11, wherein the image capturing comprises receiving an image from the plurality of images directly into a memory via direct memory access.

13. The method of any of embodiments 2 to 12, wherein each of the plurality of illumination settings is associated with an image instance, wherein a first image instance is processed concurrently with a second image instance such that the capturing an image associated with the second image instance is triggered based on starting image enhancing on an image associated with the first image instance.

14. The method of embodiment 13, wherein the capturing the image associated with the second image instance can occur concurrently with transmitting an enhanced image associated with the first image instance.

15. The method of any of embodiments 2 to 14, wherein the plurality of images are ordered as a sequence of images and the identification of microorganisms occurs after the image enhancement of a final image from the sequence of images.

16. The method of embodiment 15, wherein image capturing any subsequent image of the sequence of images occurs in response to starting image enhancing of a prior image from the sequence of images stored in the memory.

17. The method of any of embodiments 15 to 16, wherein the plurality of enhanced images are ordered as a sequence of enhanced images with each enhanced image corresponding to the sequence of images.

18. The method of any of embodiments 15 to 17, wherein the transmitting of an enhanced prior image from the sequence of enhanced images to the interaction component occurs in response to a completion of image enhancing the prior image to form the enhanced prior image from the sequence of enhanced images.

19. The method of any of embodiments 15 to 18, wherein the sequence of images comprises a first image, and a second image, and
   image capturing the plurality of images comprises:
   illuminating, via illumination circuitry, the culture device with a first illumination setting, the first illumination setting is configured based on the culture device;
   image capturing, via the image capture circuitry, the first image of the culture device at the first illumination setting; and
   receiving the first image directly into the memory via direct memory access.

20. The method of any of embodiments 15 to 19, wherein image capturing the plurality of images further comprises:
   illuminating, via the illumination circuitry, the culture device with a second illumination setting responsive to causing the image capture circuitry to image capturing the first image;
   image capturing, via the image capture circuitry, a second image of the culture device at the second illumination setting; and
   receiving the second image into the memory via direct memory access.

21. The method of any of embodiments 15 to 20, wherein image enhancing the plurality of images further comprises:
  initiating image enhancing the first image stored in the memory prior to or at the same time as illuminating the culture device with the second illumination setting.

22. The method of any of embodiments 15 to 21, further comprising:
  completing image enhancing of the first image to form a first enhanced image, wherein transmitting the plurality of images comprises transmitting the first enhanced image from the memory to the interaction component.

23. The method of any of embodiments 15 to 22, wherein identifying microorganisms on the culture device further comprises providing the first enhanced image to the deep learning model.

24. The method of any of embodiments 15 to 23, wherein at least some processes of the deep learning model are performed on the first enhanced image until a final enhanced image in a sequence of enhanced images is transmitted to the interaction component.

25. The method of any of embodiments 15 to 24, wherein capturing the plurality of images further comprises:
  illuminating, via the illumination circuitry, the culture device with a third illumination setting in response to image capturing, with the image capture circuitry, the second image; and
  wherein the image enhancing the plurality of images comprises:
  initiating image enhancing of the second image stored in the memory.

26. The method of any of embodiments 15 to 25, wherein capturing the plurality of images further comprises:
  image capturing, via the image capture circuitry, a third image into the memory via direct memory access in response to the initiating image enhancing of the second image.

27. The method of any of embodiments 15 to 26, further comprising:
  completing image enhancing of the second image to form a second enhanced image,
  wherein transmitting the plurality of images comprises transmitting the second enhanced image from the memory to the interaction component.

28. The method of any of embodiments 15 to 27, wherein identifying microorganisms on the culture device further comprises providing the second enhanced image to the deep learning model;
  wherein at least some process of the deep learning model are performed on the second enhanced image until the third enhanced image in the sequence of enhanced images is transmitted to the interaction component.

29. The method of any of embodiments 15 to 28, further comprising image enhancing the third image stored in the memory to create a third enhanced image; and
  wherein transmitting the plurality of images comprises transmitting the third image from the memory to the interaction component via direct memory access.

30. The method of any of embodiments 15 to 29, wherein identifying microorganisms on the culture device further comprises providing the third enhanced image to the deep learning model.

31. The method of any of embodiments 15 to 30, further comprising:
  removing the culture device from the colony enumeration device;
  identifying microorganisms based on sequence of enhanced images after all of the sequence of enhanced images is obtained and the culture device is removed.

32. The method of any of embodiments 1 to 31, wherein the deep learning model does not perform directed feature extraction on the combined image.

33. The method of any of embodiments 1 to 32, wherein the deep learning model is a neural network comprising an input layer, a plurality of hidden layers, and an output layer.

34. The method of embodiment 33, wherein the deep learning model does not include only one hidden layer.

35. The method of embodiment 33 or 34, wherein the deep learning model comprises a segmentation model and a classification model.

36. The method of embodiment 35, wherein the segmentation model is a regional proposal network and the classification model is a regional convolutional neural network (R-CNN).

37. The method of embodiment 35 or 36, wherein the deep learning model is a Faster R-CNN.

38. The method of any of embodiments 1 to 37, wherein identifying microorganisms occurs using dedicated neural network circuitry that is distinct from the interaction component.

39. The method of any of embodiments 1 to 38, wherein identifying microorganisms in the culture device based on the plurality of images comprises transmitting an image from the plurality of images to the deep learning model trained to select and identify a colony morphology characteristic in the image, and provide a probability of the colony forming unit of a microorganism being present in the image based on the colony morphology characteristic.

40. The method of embodiment 39, wherein the identify the colony morphology characteristic comprises determining a pixel range of the colony morphology characteristic.

41. The method of any of embodiments 1 to 40, further comprising:
  determining a plate type of the culture device;
  in response to the plate type, activating a second mode, wherein the second mode comprises:
    providing the plurality of images to the interaction component, wherein some image enhancement is performed prior to the providing, and the interaction component determines a plurality of identification characteristics of colony forming units in the culture device based on the plurality of images.

42. The method of any of embodiments 1 to 41, wherein the interaction component is configured to provide a plurality of colony forming units projected onto the combined image of the culture device within 6 seconds of starting a culture device through a feed mechanism.

43. The method of any of embodiments 1 to 42, wherein the plurality of images is a sequence of images,
  wherein a second image from the sequence of images is image captured based on starting, but not completing, the image enhancement of the first image from the sequence of images, and
  wherein a third image from the sequence of images is image captured based on starting, but not completing, the image enhancement of the second image from the sequence of images.

44. A non-transitory computer-readable storage medium including instructions that, when processed by a computer, configure the computer to perform the method of any of embodiments 1 to 43.

44a. A colony enumeration device configured to perform the method of any of the preceding embodiments.

45. A colony enumeration device, comprising:
- a single-board computer comprising:
  - neural network circuitry,
    - input output circuitry configured to communicatively couple to an interaction component;
  - a processor; and
  - a memory storing instructions that, when executed by the processor, configure the single-board computer to:
    - identify colony forming units of microorganisms in a combined image, using a deep learning model running on the neural network circuitry; and
    - provide a plurality of identification characteristics of the colony forming units to an interaction component such that the interaction component can project at least some of the plurality of identification characteristics onto the combined image.

45a. The colony enumeration device of embodiment 45, wherein the deep learning model is a pretrained deep learning model.

45b. The colony enumeration device of embodiment 45, wherein the deep learning model receives a corpus of identified colony forming units of microorganisms and colony morphology characteristics thereof and adjusts weights of some artificial neurons in the hidden layer to form the pretrained deep learning model.

46. The colony enumeration device of embodiment 45, further comprising:
- image capture circuitry communicatively coupled to the single-board computer and configured to image capture a culture device at a plurality of illumination settings to form a plurality of images, wherein the image capture circuitry comprises illumination circuitry that controls the plurality of illumination settings;
- wherein the single-board computer comprises image enhancement circuitry configured to perform image enhancing on the plurality of images to form a plurality of enhanced images, and
- wherein the memory stores instructions that, when executed by the processor, configured the input output circuitry to transmit the plurality of enhanced images to an interaction component using direct memory access, wherein at least two of the image capturing process, image enhancing process, or transmitting to the interaction component process occur concurrently for different image instances.

47. The colony enumeration device of embodiment 46, wherein the single-board computer uses overlapped interleaved processing for at least two of the image capturing process, image enhancing process, or transmitting to the interaction component process.

48. The colony enumeration device of any of embodiments 46 to 47, wherein the image capturing process of a subsequent image instance is triggered by the image enhancing process of a prior image instance.

49. The colony enumeration device of any of embodiments 46 to 48, wherein the memory stores instructions that, when executed by the processor, configured the single-board computer to form the combined image from at least some of the plurality of enhanced images that were previously transmitted.

50. The computing apparatus of any of embodiments 46 to 49, wherein the memory stores instructions that, when executed by the processor, configure the single-board computer to:
- perform partial processing of identifying colony forming units of microorganisms on an enhanced image from a subsequent image instance using the deep learning model and concurrently with the image capturing, image enhancing, or transmitting of a prior image instance.

51. The colony enumeration device of any of embodiments 46 to 50, further comprising:
- a feed mechanism communicatively coupled to the single-board computer and configured to receive a culture device and position the culture device for image capture;
- wherein the memory stores instructions that, when executed by the processor, configure the single-board computer to:
  - receive an indication from a feed mechanism that the culture device has been inserted and is in position; and
  - image capture the culture device in response to receiving the indication.

52. The colony enumeration device of any of embodiments 46 to 51, wherein the plurality of images are ordered as a sequence of images and the identification of microorganisms occurs after the image enhancement of a final image from the sequence of images.

53. The colony enumeration device of any of embodiments 46 to 52, wherein image capturing any subsequent image of the sequence of images occurs in response to starting image enhancing of a prior image from the sequence of images stored in the memory.

54. The colony enumeration device of any of embodiments 46 to 53, wherein the plurality of enhanced images are ordered as a sequence of enhanced images with each enhanced image corresponding to the sequence of images.

55. The colony enumeration device of any of embodiments 46 to 54, wherein the transmitting of an enhanced prior image from the sequence of enhanced images to the interaction component occurs in response to a completion of image enhancing the prior image to form the enhanced prior image from the sequence of enhanced images.

56. The colony enumeration device of any of embodiments 46 to 55, wherein capturing the plurality of images comprises:
- cause illumination circuitry to illuminate the culture device with a first illumination setting in response to the indication, the first illumination setting is configured based on the culture device;
- cause the image capture circuitry to capture a first image of the culture device at the first illumination setting; and
- receive the first image directly into the memory.

57. The colony enumeration device of any of embodiments 46 to 56, wherein capturing the plurality of images further comprises:
- cause the illumination circuitry to illuminate the culture device with a second illumination setting in response to causing the image capture circuitry to capture the first image;
- cause the image capture circuitry to capture a second image of the culture device at the second illumination setting; and
- receive the second image into the memory.

58. The colony enumeration device of any of embodiments 46 to 57, wherein image enhancing comprises image enhancing the first image stored in the memory to create a first enhanced image in response to causing the image capture circuitry to capture the second image.

59. The colony enumeration device of any of embodiments 46 to 58, wherein transmit some of the plurality of images comprises transmitting the first enhanced image from the memory to the interaction component.

60. The colony enumeration device of any of embodiments 46 to 59, wherein capturing the plurality of images further comprises:
cause the illumination circuitry to illuminate the culture device with a third illumination setting in response to causing the image capture circuitry to capture the second image;
wherein image enhancing some of the plurality of images comprises image enhancing the second image to form a second enhanced image in response to causing the illumination circuitry to illuminate the culture device with the third illumination setting.

61. The colony enumeration device of any of embodiments 46 to 60, wherein capturing the plurality of images further comprises:
cause the image capture circuitry to capture a third image in response to starting image enhancement of second image; and
receive the third image directly into the memory.

62. The colony enumeration device of any of embodiments 46 to 61, wherein identifying the colony forming units in the culture device is based on the plurality of enhanced images, and the deep learning model is trained to identify a colony morphology characteristic of a colony forming unit of a microorganism species in an image, and provide a probability of the colony forming unit being present in the image.

63. The colony enumeration device of any of embodiments 46 to 62, wherein the identify the colony morphology characteristic comprises determine a pixel range of the colony morphology characteristic.

64. The colony enumeration device of any of embodiments 46 to 63, further comprising:
wherein the feed mechanism comprises a reader,
wherein the memory stores instructions that, when executed by the processor, configure the single-board computer to:
determine, using the reader, a plate type of the culture device;
in response to the plate type, activate a second mode, wherein the second mode comprises:
provide the plurality of images to the interaction component, wherein some image enhancement is performed prior to the providing, and the interaction component determines a plurality of identification characteristics of colony forming units in the culture device based on the plurality of enhanced images previously transmitted.

65. The colony enumeration device of any of embodiments 46 to 64, wherein the interaction component is configured to provide a plurality of colony forming units projected on the combined image with a colony count within 6 seconds of the culture device being loaded into the feed mechanism.

66. The colony enumeration device of any of embodiments 46 to 65, wherein the plurality of images is a sequence of images,
wherein a second image from the sequence of images is captured based on starting, but not completing, the image enhancement of the first image from the sequence of images, and
wherein a third image from the sequence of images is captured based on starting, but not completing, the image enhancement of the second image from the sequence of images.

67. The colony enumeration device of any of embodiments 45 to 66, wherein the single-board computer comprises:
a system-on-module, further comprising the processor, the memory, the image enhancement circuitry and the neural network circuitry; and
an interface circuitry attached to the system-on-module, the illumination circuitry, the image capture circuitry, the interaction component, the feed mechanism, the system-on-module.

68. The colony enumeration device of any of embodiments 45 to 67, wherein the single-board computer is configured to host a low-resource operating system.

69. A system comprising:
the colony enumeration device of any of embodiments 45 to 68; and
an external computer comprising a display device.

70. The system of embodiment 69, wherein the external computer is configured to project at least some of the plurality of identification characteristics onto the combined image within 6 seconds of the culture device being received by the colony enumeration device.

What is claimed is:

1. A method of colony enumeration, comprising:
identifying colony forming units of microorganisms in a combined image using a pretrained deep learning model on a colony enumeration device;
providing a plurality of identification characteristics of the colony forming units to an interaction component such that the interaction component can project at least some of the plurality of identification characteristics onto the combined image;
image capturing, with image capture circuitry, a culture device at a plurality of illumination settings to form a plurality of images of the culture device at a single incubation instance;
image enhancing, with image enhancement circuitry, the plurality of images to form a plurality of enhanced images; and
transmitting of the plurality of enhanced images to the interaction component, wherein at least two of the image capturing process, image enhancing process, or transmitting to the interaction component process occur concurrently for different image instances, wherein the combined image is formed from at least some of the plurality of enhanced images;
wherein the interaction component is configured to provide a plurality of colony forming units projected onto the combined image of the culture device within 6 seconds of starting a culture device through a feed mechanism.

2. The method of claim 1, wherein image enhancing some of the plurality of images occurs concurrent with image capturing the culture device at some of the plurality of illumination settings.

3. The method of claim 1, wherein the image enhancing process comprises flat field normalization, convolutions, sharpening, histogramic equalization, contrast enhancements, and combinations thereof.

4. The method of claim 1, wherein each of the plurality of illumination settings is associated with an image instance, wherein a first image instance is processed concurrently with a second image instance such that the capturing an image associated with the second image instance is triggered based on starting image enhancing on an image associated with the first image instance.

5. The method of claim 1, wherein the capturing the image associated with the second image instance occurs concurrently with transmitting an enhanced image associated with the first image instance.

6. The method of claim 5, wherein identifying colony forming units further comprises providing the enhanced image to the pretrained deep learning model, wherein at least some processes of the pretrained deep learning model are performed on the first enhanced image until a final enhanced image in a sequence of enhanced images is transmitted to the interaction component.

7. The method of claim 1 wherein identifying colony forming units of microorganisms in the culture device comprises transmitting the combined image to the pretrained deep learning model trained to identify a colony morphology characteristic in the image, and receiving, from the pretrained deep learning model, a probability of the colony forming unit of a microorganism being present in the image based on the colony morphology characteristic.

8. The method of claim 1, wherein the plurality of identification characteristics are selected from: probability of the colony forming unit being a colony type, a microorganism associated with the colony forming unit, coordinates of the center point of a colony forming unit, an extent of the colony forming unit, and combinations thereof.

9. The method of claim 1, further comprising:
training a deep learning model with a corpus of identified colony forming units of microorganisms and colony morphology characteristics thereof to form the pretrained deep learning model.

10. A non-transitory computer-readable storage medium including instructions that, when processed by a computer, configure the computer to perform the method of claim 1.

11. The method of claim 1, wherein the plurality of images and the plurality of enhanced images comprise three images and three enhanced images, respectively, corresponding to red, blue, and green color channels and the combined images of the three enhanced images is an RGB image;
wherein the enhanced images corresponding to the red, blue, and green color channels are combined via interleaving bytewise to form a 24-bit RGB image.

12. A colony enumeration device, comprising:
a single-board computer comprising:
neural network circuitry,
input output circuitry configured to communicatively couple to an interaction component;
a processor;
image capture circuitry communicatively coupled to the single-board computer and configured to image capture a culture device at a plurality of illumination settings to form a plurality of images at a single incubation instance, wherein the image capture circuitry comprises illumination circuitry that controls the plurality of illumination settings; and
a memory storing instructions that, when executed by the processor, configure the single-board computer to:
identify colony forming units of microorganisms in a combined image, using a pretrained deep learning model on the neural network circuitry; and
provide a plurality of identification characteristics of the colony forming units to an interaction component such that the interaction component can project at least some of the plurality of identification characteristics onto the combined image.

13. The colony enumeration device of claim 12,
wherein the single-board computer comprises image enhancement circuitry configured to perform image enhancing on the plurality of images to form a plurality of enhanced images, and
wherein the memory stores instructions that, when executed by the processor, configured the input output circuitry to transmit the plurality of enhanced images to an interaction component using direct memory access, wherein at least two of the image capturing process, image enhancing process, or transmitting to the interaction component process occur concurrently for different image instances.

14. The colony enumeration device of claim 13, wherein the single-board computer uses overlapped interleaved processing for at least two of the image capturing process, image enhancing process, or transmitting to the interaction component process.

15. The colony enumeration device of claim 13, wherein the image capturing process of a subsequent image instance is triggered by the image enhancing process of a prior image instance.

16. The colony enumeration device of claim 13, wherein the memory stores instructions that, when executed by the processor, configured the single-board computer to form the combined image from at least some of the plurality of enhanced images that were previously transmitted.

17. The colony enumeration device of claim 13, further comprising:
a feed mechanism communicatively coupled to the single-board computer and configured to receive a culture device and position the culture device for image capture;
wherein the memory stores instructions that, when executed by the processor, configure the single-board computer to:
receive an indication from a feed mechanism that the culture device has been inserted and is in position; and
image capture the culture device in response to receiving the indication.

18. A microorganic detection system comprising:
the colony enumeration device of claim 13; and an interaction component comprising a display device.

19. The system of claim 18, wherein the interaction component is configured to project at least some of the plurality of identification characteristics onto the combined image within 6 seconds of the culture device being received by a feed mechanism of the colony enumeration device.

* * * * *